(12) United States Patent
Kim

(10) Patent No.: US 11,036,687 B2
(45) Date of Patent: Jun. 15, 2021

(54) DEVICE SEARCHING SYSTEM AND METHOD FOR DATA TRANSMISSION

(71) Applicant: Samsung Electronics Co., Ltd., Suwon-si (KR)

(72) Inventor: Jae-hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 15/948,746

(22) Filed: Apr. 9, 2018

(65) Prior Publication Data

US 2018/0225302 A1  Aug. 9, 2018

Related U.S. Application Data

(63) Continuation of application No. 13/471,824, filed on May 15, 2012, now abandoned.

(30) Foreign Application Priority Data

Feb. 16, 2012  (KR) ........................ 10-2012-0015893

(51) Int. Cl.
  *G06F 16/176*    (2019.01)
  *G06Q 10/10*    (2012.01)
  *H04L 12/58*    (2006.01)

(52) U.S. Cl.
  CPC ......... *G06F 16/176* (2019.01); *G06Q 10/107* (2013.01); *H04L 51/04* (2013.01); *H04L 51/046* (2013.01)

(58) Field of Classification Search
  CPC ............. G06F 17/30165; G06F 3/0481; G06F 3/0484; G06F 16/176; H04L 51/046; H04L 51/04; G06Q 10/107
  See application file for complete search history.

(56) References Cited

U.S. PATENT DOCUMENTS

| 2,731,966 A | 1/1956 | Neilsen |
| 8,458,597 B1 * | 6/2013 | Tijssen ............... H04N 21/4788 715/748 |
| 8,554,194 B2 | 10/2013 | Kim et al. |
| 8,874,608 B2 | 10/2014 | Song et al. |

(Continued)

FOREIGN PATENT DOCUMENTS

| EP | 2219354 A2 | 8/2010 |
| JP | 2006-505991 A | 2/2006 |

(Continued)

OTHER PUBLICATIONS

Korean Office Action dated Feb. 25, 2019, issued in Korean Patent Application No. 10-2012-0015893.

*Primary Examiner* — Tuyetlien T Tran
(74) *Attorney, Agent, or Firm* — Jefferson IP Law, LLP

(57) ABSTRACT

A device searching system and method for data transmission are provided. A method of searching for another device in a first device for data transmission includes outputting a widget window for a device search, receiving an address book stored in a second device connected to the first device, and if the widget window is selected, searching for a device included in the received address book, wherein the searching of the device includes searching for at least one of devices included in the received address book based on a keyword input through the widget window.

20 Claims, 17 Drawing Sheets

(56) References Cited

U.S. PATENT DOCUMENTS

| | | | |
|---|---|---|---|
| 2008/0022304 A1 | 1/2008 | Prus et al. | |
| 2009/0327282 A1* | 12/2009 | Wittig | G06F 16/176 |
| 2010/0064231 A1 | 3/2010 | Gupta | |
| 2010/0210293 A1* | 8/2010 | Lim | H04M 1/274516 |
| | | | 455/466 |
| 2010/0251177 A1 | 9/2010 | Geppert et al. | |
| 2011/0237228 A1* | 9/2011 | Chung | H04M 3/4288 |
| | | | 455/414.1 |
| 2011/0307797 A1 | 12/2011 | Imamichi et al. | |
| 2012/0265806 A1* | 10/2012 | Blanchflower | H04L 51/32 |
| | | | 709/204 |
| 2012/0272176 A1* | 10/2012 | Nielsen | G06F 16/9032 |
| | | | 715/779 |
| 2013/0007627 A1 | 1/2013 | Monaco | |

FOREIGN PATENT DOCUMENTS

| | | |
|---|---|---|
| KR | 10-2004-0060636 A | 7/2004 |
| KR | 10-2005-0104146 A | 11/2005 |
| KR | 10-2006-0007623 A | 1/2006 |
| KR | 10-2006-0038656 A | 5/2006 |
| KR | 10-2008-0000114 A | 1/2008 |
| KR | 10-2009-0077166 A | 7/2009 |
| KR | 10-2010-0092848 A | 8/2010 |
| KR | 10-2011-0034497 A | 4/2011 |
| KR | 10-2011-0037247 A1 | 4/2011 |
| KR | 10-2011-0103515 A | 9/2011 |
| WO | 2004043070 A1 | 5/2004 |
| WO | 2005099242 A1 | 10/2005 |

\* cited by examiner

| SHORTCUT NUMBER | USER | TELEPHONE NUMBER | GROUP | DEVICE | APPLICATION |
|---|---|---|---|---|---|
| 1 | Tom | 555-1234 | Friend | Galaxy S2 | Twitter |
| 2 | John | 777-4321 | Business | I-Phone 4S | Facebook |
| ... | ... | ... | ... | ... | ... |

DEVICE SEARCHING SYSTEM AND METHOD FOR DATA TRANSMISSION

PRIORITY

This application is a continuation application of prior application Ser. No. 13/471,824, filed on May 15, 2012, which is based on and claimed the benefit priority under 35 U.S.C. § 119(a) of Korean patent application number 10-2012-0015893, filed on Feb. 16, 2012, in the Korean Intellectual Property Office, the entire disclosure of which is incorporated by reference herein in its entirety.

BACKGROUND OF THE INVENTION

1. Field of the Invention

The present invention relates to a device searching system and method for data transmission. More particularly, the present invention relates to a system and method for searching for a device to transmit data thereto by using an address book stored in another device.

2. Description of the Related Art

The act of generating content, such as photographs and moving pictures, using a smart phone is increasing. Also, the need to share data between a Personal Computer (PC) and a smart phone is increasing at least partly due to the enhancements to the performance of smart phones and the widespread adoption of office applications. In addition, various services for sharing data between a PC and a phone are provided by using at least one of a PC Client, a Cloud service, Windows Explorer, and so forth. However, since a PC and a phone are typically connected through a Universal Serial Bus (USB) cable, a complex setup is performed before data is able to be shared. Thus, a technique for effectively searching for a device by using an address book stored in a phone and transmitting data to a found device via the phone is desired.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. According, an aspect of the present invention is to provide a device searching system and method for data transmission, whereby a device to which the data is transmitted can be searched for by using an address book stored in another device.

Another aspect of the present invention is to provide a device searching system and method for data transmission, whereby a device to which the data is transmitted can be searched for from an address book stored in another device through a widget window displayed on a device.

In accordance with an aspect of the present invention, a method of searching for another device in a first device for data transmission is provided. The method includes outputting a widget window for a device search, receiving an address book stored in a second device connected to the first device, and if the widget window is selected, searching for a device included in the received address book, wherein the searching of the device includes searching for at least one of devices included in the received address book based on a keyword input through the widget window.

The input keyword may include a pre-set tag value, and the devices included in the received address book may be filtered based on the tag value.

The tag value may be identified based on types of applications installed in the devices included in the received address book.

The first device may include at least one of a Personal Computer (PC), a tablet PC, and a smart TV, and the second device may be a mobile communication terminal.

The first device and the second device may be connected to each other through Wireless Fidelity (Wi-Fi) communication, and the second device may transmit data received from the first device to the found device through at least one of a $3^{rd}$ Generation (3G) mobile communication and a $4^{th}$ Generation (4G) mobile communication.

The method may further include, if a call request is received from a third device to the second device, receiving outgoing call information of the third device from the second device, and displaying the received outgoing call information on the widget window.

The method may further include providing information regarding a call connection with the third device to the second device according to a user input based on the outgoing call information displayed on the widget window, wherein the information regarding a call connection is used to determine whether the second device performs a call with the third device.

If a call reject button is selected on the widget window, a message input window related to the call connection may be displayed, and a text message input through the message input window may be transmitted to the third device via the second device.

In accordance with another aspect of the present invention, a first device for searching for another device to transmit data thereto is provided. The first device includes a widget window generator for generating a widget window for a device search, a data receiver for receiving an address book from a second device connected to the first device, and a search unit for, if the widget window is selected, searching for a device included in the received address book, wherein the search unit searches for at least one of devices included in the received address book based on a keyword input through the widget window.

The input keyword may include a pre-set tag value, and the search unit may filter some of the devices included in the received address book based on the tag value.

The tag value may be identified based on types of applications installed in the devices included in the received address book.

The first device may include at least one of a PC, a tablet PC, and a smart TV, and the second device may be a mobile communication terminal.

The first device may further include a connection unit for connecting the second device thereto through Wi-Fi communication, and the second device may be connected to the found device through at least one of the 3G mobile communication and the 4G mobile communication.

The connection unit may request the second device for activation of a tethering function of the second device when the widget window is activated or selected.

The data receiver may receive outgoing call information of a third device from the second device if a call request is received from the third device to the second device, and the first device may further include a data output unit for displaying the received outgoing call information on the widget window.

The first device may further include a data transmitter for providing information regarding a call connection with the third device to the second device according to a user input based on the outgoing call information displayed on the widget window, wherein the information regarding a call connection is used to determine whether the second device performs a call with the third device.

The data output unit may display a message input window related to the call connection if a call reject button is selected on the widget window, and the data transmitter may transmit a text message input through the message input window to the third device via the second device.

In accordance with another aspect of the present invention, a method of providing an address book in a second device so that a first device can search for another device for data transmission is provided. The method includes connecting the first device to the second device, and providing the address book to the connected first device, wherein the address book provided to the connected first device is used for the first device to search for a device included in the received address book if a pre-set widget window is selected in the first device.

In accordance with another aspect of the present invention, a non-transitory computer-readable recording medium storing a computer-readable program for executing the method of searching for another device in a first device for data transmission is provided.

In accordance with another aspect of the present invention, a non-transitory computer-readable recording medium storing a computer-readable program for executing the method of providing an address book in a second device so that a first device can search for another device for data transmission is provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When it is described herein that a certain part is "connected" to another part, it should be understood that the certain part may be directly connected to another part or electrically connected to another part via another part in the middle. In addition, when a certain part "includes" a certain component, this indicates that the part may further include another component instead of excluding another component unless there is no different disclosure.

As used herein, expressions such as "at least one of," when preceding a list of elements, modify the entire list of elements and do not modify the individual elements of the list.

Exemplary embodiments of the present invention will now be described more fully with reference to the accompanying drawings, in which exemplary embodiments of the present invention are shown.

Figure 1:
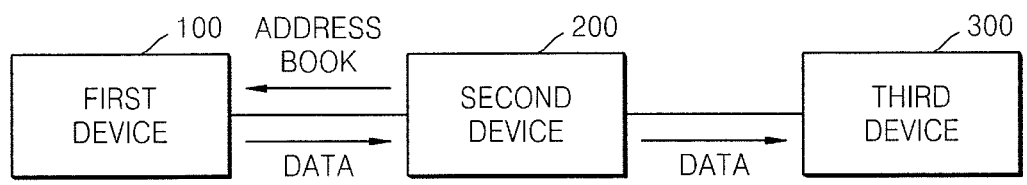
FIG. 1 is a block diagram of a device searching system for data transmission according to an exemplary embodiment of the present invention.

FIG. 1 is a block diagram of a device searching system for data transmission according to an exemplary embodiment of the present invention.

Referring to FIG. 1, the device searching system includes a first device 100, a second device 200, and a third device 300. The first device 100 may include at least one of a Personal Computer (PC), a tablet PC, and a smart TV, and the second device 200 and the third device 300 may be mobile communication terminals, but they are not limited thereto.

In the device searching system, the first device 100 may search for the third device 300 with which data is transmitted and received by using an address book stored in the second device 200. In this case, the first device 100 may generate and display a separate widget window for the device search and the data transmission, and when the widget window is selected by a user, the first device 100 may provide a service for the device search to the user. The device search may be performed by searching for at least one device from a user list or a device list included in the address book, i.e., at least one of a telephone number, a user name, a user email address, and a user Social Network Service (SNS) account of the at least one device included in the address book.

In addition, the first device 100 may transmit and receive data to and from the third device 300 by using a wireless communication function of the second device 200. When the second device 200 receives a text message from the third device 300, the first device 100 may receive and display the text message from the second device 200, and the user may perceive the text message through the first device 100 and provide a response message to the third device 300 via the second device 200.

In addition, when the second device 200 receives a call request from the third device 300, the second device 200 may provide outgoing call information of the third device 300 to the first device 100. In this case, the user may perceive the outgoing call information of the third device 300 through the first device 100 and determine whether to accept the call request. In addition, the user may perceive the outgoing call information of the third device 300 through the first device 100, edit a message related to the call request, and provide the message related to the call request to the third device 300 via the second device 200.

In addition, the first device 100 may provide a file stored in the first device 100 to the second device 200 through the widget window. In addition, the first device 100 may receive content being executed by the second device 200 and output the received content.

A detailed configuration of the first device 100 according to an exemplary embodiment of the present invention will now be described with reference to FIG. 2.

Figure 2:
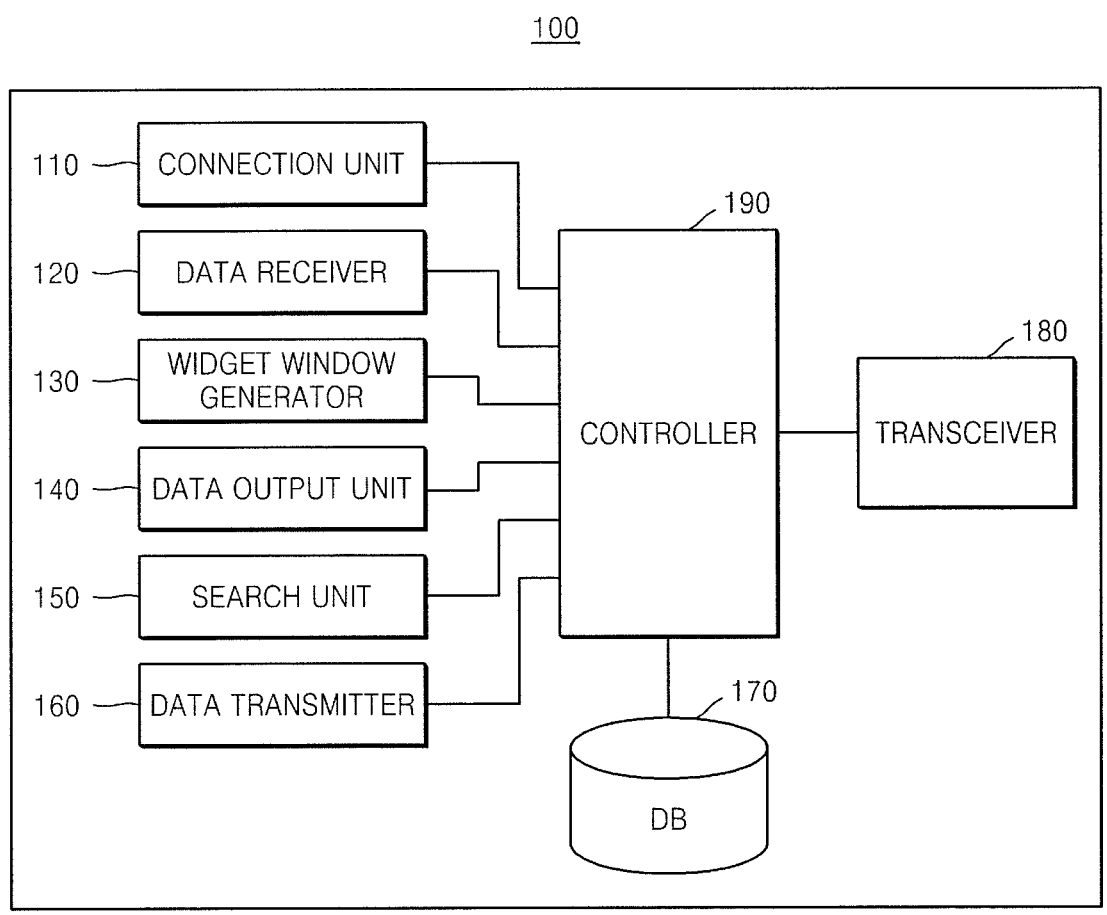
FIG. 2 is a block diagram of a first device according to an exemplary embodiment of the present invention.

FIG. 2 is a block diagram of the first device 100 according to an exemplary embodiment of the present invention.

Referring to FIG. 2, the first device 100 includes a connection unit 110, a data receiver 120, a widget window generator 130, a data output unit 140, a search unit 150, a data transmitter 160, a DataBase (DB) 170, a transceiver 180, and a controller 190.

The connection unit 110 connects the first device 100 to the second device 200. The connection unit 110 may connect the first device 100 to the second device 200 based on a user input through a widget window generated by the widget window generator 130 to be described below. For example, when the user selects a tethering button of the widget window, the connection unit 110 may request the second device 200 for the connection. However, the connection unit 110 is not limited thereto, and even though a separate user input is not received, when the widget window is executed, the connection unit 110 may request the second device 200 for the connection.

In addition, the connection unit 110 may receive and store access information for the connection to the second device 200 from the second device 200, but the present invention is not limited thereto. The connection unit 110 may receive the access information for the connection from the second device 200 after the connection unit 110 requests the second device 200 for the connection. In addition, the access information for the connection between the first device 100 and the second device 200 may be previously set in the first device 100 and the second device 200 by the user.

The data receiver 120 receives data from the second device 200. The data receiver 120 may receive an address book stored in the second device 200 from the second device 200. The received address book may be used for the first device 100 to search for a device for data transmission by using the widget window to be described below. In addition, the data receiver 120 may receive information regarding applications installed in devices included in the address book from the second device 200. In addition, the information regarding the applications installed in the devices may be included in the address book.

In addition, the data receiver 120 may receive outgoing call information of the third device 300 from the second device 200. When the third device 300 requests the second device 200 for a call, the data receiver 120 may receive outgoing call information of the third device 300 from the second device 200. The received outgoing call information may be displayed on a screen through the widget window to be described below, but the present invention is not limited thereto.

In addition, the data receiver 120 may receive a text message received by the second device 200 from the second device 200. When the second device 200 receives a text message from the third device 300, the data receiver 120 may receive the text message and device information of the third device 300 from the second device 200. The device information may include at least one of a telephone, a user identification value, and an identification value of an application installed in the third device 300.

In addition, the data receiver 120 may receive content being executed by the second device 200. The data receiver 120 may receive the content being executed by the second device 200 in a streaming method, but the present invention is not limited thereto. In addition, when a predetermined screen is captured in the second device 200, the data receiver 120 may receive a capture screen of the second device 200.

The widget window generator 130 generates a widget window for data transmission and reception with the second device 200. The widget window may include a search field for a device search and may be displayed in a pre-set area of a background screen of the first device 100. In addition, a guidance text for the device search may be displayed in the search field of the widget window. Also, when a keyword is input through the search field of the widget window, a device corresponding to the input keyword may be searched for.

In addition, the widget window generator 130 may generate a select window for selecting a device for transmission when a file stored in the first device 100 moves to the widget window. The select window may include a list for selecting the second device 200 and a list for selecting the third device 300, which is not connected to the first device 100. For example, the select window may include a select list, such as 'transfer to second device' and 'search for another device'. In addition, when the third device 300 is selected from a device select list (i.e., when 'search for another device' is selected), a guidance text, such as 'input keyword', may be displayed in the search field of the widget window.

The data output unit 140 outputs data received from the second device 200. The data output unit 140 may display an address book received from the second device 200 on a screen when the search field of the widget window is selected by a user input.

In addition, when outgoing call information of the third device 300 is received from the second device 200, the data output unit 140 may display the received outgoing call information on the screen. The data output unit 140 may display a message related to a call on the screen based on the outgoing call information of the third device 300. In more detail, the data output unit 140 may extract a user name and a telephone number of the third device 300 from the outgoing call information of the third device 300 and output a guidance text regarding whether to receive the call by combining the extracted value and a pre-set text. For example, the data output unit 140 may display a guidance text, such as "a call is received from Tom (555-1234). Do you want to accept the call?" on the screen. In addition, when the user rejects the call, the data output unit 140 may output on the screen a message transfer window for transmitting a predetermined text message to the third device 300.

In addition, the data output unit 140 may output a text message received by the second device 200 on the screen. When the first device 100 receives a message of the third device 300 through the second device 200, the data output unit 140 may generate a chatting window so that the first device 100 can transmit and receive messages to and from the third device 300 and may output the generated chatting window on the screen.

In addition, the data output unit 140 may output content being executed by the second device 200. The data output unit 140 may perceive an application for executing the content received from the second device 200 and output the content being executed by the second device 200 through the perceived application. For example, when the first device 100 is connected to the second device 200 while a predetermined moving picture is being executed by the second device 200, the data output unit 140 may output the content streamed in real-time from the second device 200 in the first device 100. In this case, information regarding the application for executing the received content may be previously set and stored.

The search unit 150 may search for a device for data transmission based on a user input through the widget window. When the user selects the widget window and inputs a predetermined keyword in the search field of the widget window, the search unit 150 may search for a device corresponding to the input keyword from the address book received from the second device 200.

In this case, the keyword input by the user may include a pre-set tag value, and the search unit 150 may filter some of devices included in the address book based on the tag value. In addition, the tag value may be identified based on types of data transmission services supported by the devices included in the address book. For example, the tag value is a prefix value, wherein a prefix 'A' is used to search for devices in which Twitter® is installed, and a prefix 'B' is used to search for devices in which Facebook® is installed. Thus, when 'A Tom' is input through the widget window, the search unit 150 may search for devices of which a user name is 'Tom' from among the devices in which Twitter® is installed. In addition, when 'B friends' is input through the widget window, the search unit 150 may search for devices of users who are friends of the user of the first device 100 from among the devices in which Facebook® is installed.

In addition, the search unit 150 may provide a keyword input through the widget window to the second device 200 and receive device information corresponding to users found based on the keyword from the second device 200. In more detail, when the user inputs a keyword through the widget window, the search unit 150 may provide the input keyword to the second device 200. In addition, the second device 200 may search for users from the address book stored in the second device 200 by using the received keyword and provide device information corresponding to the found users to the first device 100.

The data transmitter 160 transmits data to the third device 300 via the second device 200. The data transmitter 160 may provide predetermined data to the second device 200 and transmit data to the third device 300 by using a communication function of the second device 200.

In more detail, the data transmitter 160 may provide a text message input into the first device 100 to the third device 300 via the second device 200. When the third device 300 is searched for and selected through the widget window of the first device 100, a chatting window for transmitting and receiving messages between the first device 100 and the third device 300 may be generated. In addition, when a text message is input by the user through the generated chatting window, the first device 100 may transmit the text message to the third device 300 via the second device 200.

In addition, the data transmitter 160 may transmit information regarding whether to accept a call to the third device 300 via the second device 200. When the third device 300 requests the second device 200 for a call, the second device 200 may provide outgoing call information of the third device 300 to the first device 100. In this case, the first device 100 may provide information regarding a call connection to the third device 300 to the third device 300 via the second device 200. For example, when the user rejects the call with the third device 300, the first device 100 may provide a call reject message to the third device 300. For example, an input window for inputting a message related to a call connection may be displayed on the first device 100, and the user may input a message "it is hard to accept your call because of meeting" through the input window.

In addition, the data transmitter 160 may provide a predetermined file stored in the first device 100 to the third device 300 via the second device 200. When the user selects the predetermined file stored in the first device 100, the selected file may be provided to the third device 300 via the second device 200. For example, the user may select the predetermined file stored in the first device 100, move the selected file to the widget window, search for the third device 300 through the widget window, and provide the selected file to the found third device 300.

The DB 170 stores various kinds of information used for the first device 100 to search for the third device 300 by using the address book stored in the second device 200 and transmit and receive predetermined data to and from the second device 200 and the third device 300. The DB 170 may store, for example, the address book received from the second device 200 and information regarding an application type corresponding to a predetermined tag value, but the present invention is not limited thereto.

The transceiver 180 transmits and receives data to and from the second device 200 and the third device 300. The transceiver 180 may transmit and receive data to and from the third device 300 via the second device 200.

The controller 190 controls the connection unit 110, the data receiver 120, the widget window generator 130, the data output unit 140, the search unit 150, the data transmitter 160, the DB 170, and the transceiver 180 so that the first device 100 can search for the third device 300 by using the address book stored in the second device 200 and transmit and receive predetermined data to and from the second device 200 and the third device 300.

The second device 200 according to an exemplary embodiment of the present invention will now be described with reference to FIG. 3.

Figure 3:
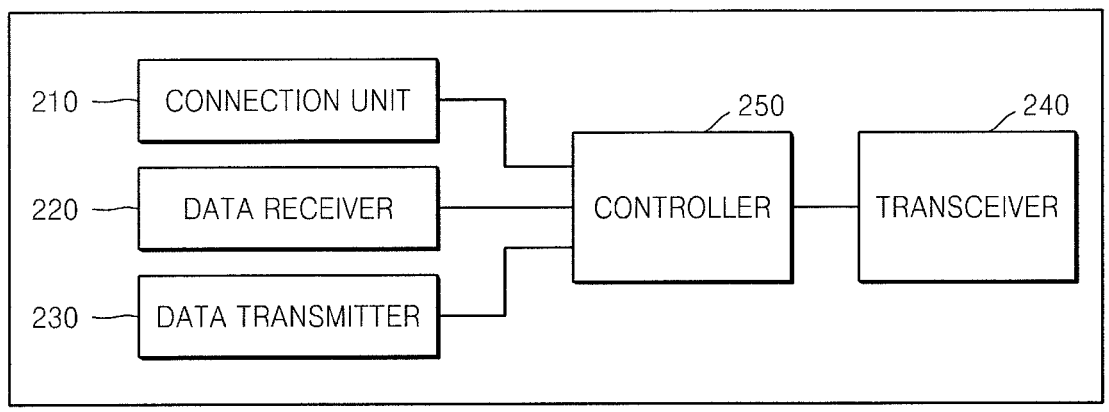
FIG. 3 is a block diagram of a second device according to an exemplary embodiment of the present invention.

FIG. 3 is a block diagram of the second device 200 according to an exemplary embodiment of the present invention.

Referring to FIG. 3, the second device 200 includes a connection unit 210, a data receiver 220, a data transmitter 230, a transceiver 240, and a controller 250.

The connection unit 210 connects the second device 200 to the first device 100. The connection unit 210 may connect the second device 200 to the first device 100 based on a user input through the widget window of the first device 100. For example, when the user selects the tethering button included in the widget window of the first device 100, the connection unit 210 may receive a connection request from the first device 100. However, the connection unit 210 is not limited thereto, and even though a separate user input is not input into the first device 100, when the widget window is executed by the first device 100, the connection unit 210 may receive the connection request from the first device 100.

In addition, the connection unit 210 may provide access information of the connection to the first device 100 and may receive and store the access information of the connection from the first device 100, but the present invention is not limited thereto. The connection unit 210 may provide the access information of the connection to the first device 100 after the connection unit 210 receives a connection request from the first device 100. In addition, the access information for the connection between the first device 100 and the second device 200 may be previously set in the first device 100 and the second device 200 by the user.

The data receiver 220 receives data to be provided to the third device 300 from the first device 100. The data receiver 220 may receive a text message input in the first device 100. In this case, the data receiver 220 may receive the text message and information regarding the third device 300 from the first device 100. For example, the data receiver 220 may receive at least one of an identification value, a telephone number, and a user name of the third device 300 from the first device 100.

In addition, the data receiver 220 may receive information regarding whether to connect a call with the third device 300 from the first device 100. The data receiver 220 may receive a call accept command or a call reject signal from the first device 100. In addition, the data receiver 220 may receive a message related to a call rejection from the first device 100. For example, the data receiver 220 may receive a message "it is hard to accept your call because of meeting".

In addition, the data receiver 220 may receive a predetermined file from the first device 100. The data receiver 220 may receive a file, which has been selected in the first device 100 and moved to the widget window, from the first device 100.

The data transmitter 230 provides an address book stored in the second device 200 to the first device 100. The address book provided to the first device 100 may be used for the first device 100 to search for a device for data transmission by using the widget window. In addition, the data transmitter 230 may provide information regarding applications installed in devices included in the address book to the first device 100 together with the address book. In addition, the information regarding the applications installed in the devices may be included in the address book.

In addition, the data transmitter 230 may provide content being executed by the second device 200 to the first device 100. The data transmitter 230 may provide the content being executed by the second device 200 in a streaming method to the first device 100, but the present invention is not limited thereto. Furthermore, when a predetermined screen is captured in the second device 200, the data transmitter 230 may provide a capture screen of the second device 200 to the first device 100.

Also, the data transmitter 230 provides data received from the first device 100 to the third device 300. The data transmitter 230 may provide a text message received from the first device 100 to the third device 300. Furthermore, the data transmitter 230 may provide a text message received from the third device 300 to the first device 100.

In addition, the data transmitter 230 may provide information regarding a call connection, which is received from the first device 100, to the third device 300. The data transmitter 230 may provide a message related to a call rejection to the third device 300.

Furthermore, the data transmitter 230 may provide a file received from the first device 100 to the third device 300.

The second device 200 may search for users by using a keyword received from the first device 100. In this case, the data receiver 220 may receive a keyword input through the widget window of the first device 100 from the first device 100, and the data transmitter 230 may transmit device information corresponding to users found based on the received keyword to the first device 100. In this case, the second device 200 may further include a search unit (not shown), and the search unit may search for users from the address book stored in the second device 200 based on the received keyword.

The transceiver 240 transmits and receives various kinds of information to and from the first device 100 and the third device 300 so that the first device 100 can search for a device by using the address book stored in the second device 200 and provide data to the found device via the second device 200.

The controller 250 controls a general operation of the second device 200 and controls the connection unit 210, the data receiver 220, the data transmitter 230, and the transceiver 240 so that the second device 200 can provide the address book to the first device 100 and data can be transmitted and received between the first device 100 and the third device 300.

A method of transmitting data between devices according to an exemplary embodiment of the present invention will now be described with reference to FIG. 4.

Figure 4:
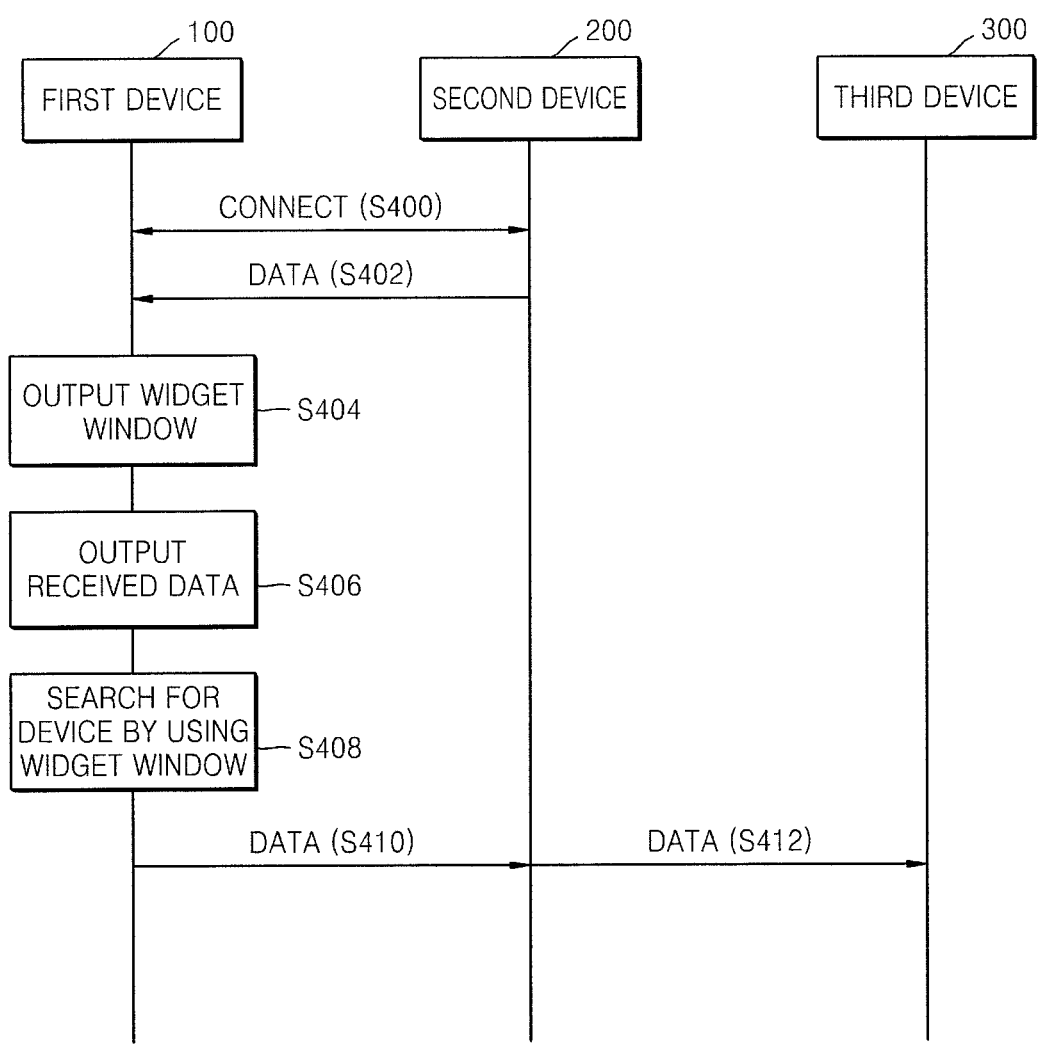
FIG. 4 is a signaling diagram of a method of transmitting data between devices, according to an exemplary embodiment of the present invention.

FIG. 4 is a signaling diagram of a method of transmitting data between devices, according to an exemplary embodiment of the present invention.

Referring to FIG. 4, in operation S400, the first device 100 and the second device 200 are connected to each other. In operation S400, the first device 100 may be connected to the second device 200 based on a user input through the widget window. For example, when the user selects the tethering button of the widget window, the first device 100 may request the second device 200 for a connection. However, the first device 100 is not limited thereto, and even though a separate user input is not received, when the widget window is executed, the first device 100 may request the second device 200 for the connection. In addition, when a predetermined screen is captured in the second device 200, the first device 100 may receive the capture screen of the second device 200.

In addition, in operation S400, the first device 100 may receive and store access information for the connection to the second device 200 from the second device 200, but the present invention is not limited thereto. The first device 100 may receive the access information from the second device 200 after the first device 100 requests the second device 200 for the connection. In addition, the access information for the connection between the first device 100 and the second device 200 may be previously set in the first device 100 and the second device 200 by the user.

In operation S402, the first device 100 receives data from the second device 200. In operation S402, the first device 100 may receive an address book stored in the second device 200. The address book received from the second device 200 may be used for the first device 100 to search for a device for data transmission by using the widget window. In addition, the first device 100 may receive information regarding applications installed in devices included in the address book from the second device 200. In addition, the information regarding the applications installed in the devices may be included in the address book.

In addition, in operation S402, the first device 100 may receive outgoing call information of the third device 300 from the second device 200. When the third device 300 requests the second device 200 for a call, the first device 100 may receive outgoing call information of the third device 300 from the second device 200. The received outgoing call information may be displayed on a screen through the widget window, but the present invention is not limited thereto.

Also, in operation S402, the first device 100 may receive a text message received by the second device 200 from the second device 200. When the second device 200 receives a text message from the third device 300, the first device 100 may receive the text message and device information of the third device 300 from the second device 200. The device information may include at least one of a telephone, a user identification value, and an identification value of an application installed in the third device 300.

In addition, in operation S402, the first device 100 may receive content being executed by the second device 200. The first device 100 may receive the content being executed by the second device 200 in a streaming method, but the present invention is not limited thereto.

In operation S404, the first device 100 outputs a widget window. In operation S404, the first device 100 may output a widget window for data transmission and reception with the second device 200. The widget window may include a search field for a device search and may be displayed in a pre-set area of a background screen of the first device 100. In addition, a guidance text for the device search may be displayed in the search field of the widget window. Although it is described in FIG. 4 that the widget window is output after operation S402, the current exemplary embodiment is not limited thereto, and the widget window may be output before operation S400 or S402.

In operation S406, the first device 100 outputs data received from the second device 200. The first device 100 may display an address book received from the second device 200 on a screen when the search field of the widget window is selected by a user input.

In addition, when outgoing call information of the third device 300 is received from the second device 200, the first device 100 may display the received outgoing call information on the screen. The first device 100 may display a message related to a call on the screen based on the outgoing call information of the third device 300. In more detail, the first device 100 may extract a user name and a telephone number of the third device 300 from the outgoing call information of the third device 300 and output a guidance text regarding whether to accept the call by combining the extracted value and a pre-set text. For example, the first device 100 may display a guidance text, such as "a call is received from xxx (555-1234). Do you want to accept the call?" on the screen. In addition, when the user rejects the call, the first device 100 may output on the screen a message transfer window for transmitting a predetermined text message to the third device 300.

In addition, in operation S406, the first device 100 may output a text message received by the second device 200 on the screen. When the first device 100 receives a message of the third device 300 through the second device 200, the first device 100 may generate a chatting window so that the first device 100 can transmit and receive messages to and from the third device 300 and may output the generated chatting window on the screen.

In addition, the first device 100 may output content being executed by the second device 200. The first device 100 may perceive an application for executing the content received from the second device 200 and output the content being executed by the second device 200 through the perceived application. For example, when the first device 100 is connected to the second device 200 while a predetermined moving picture is being executed by the second device 200, the first device 100 may output the content streamed in real-time from the second device 200. In this case, information regarding the application for executing the received content may be previously set and stored.

In operation S408, the first device 100 may search for a device for data transmission by using the widget window. The first device 100 may search for the device for data transmission based on a user input through the widget window. When the user selects the widget window and inputs a predetermined keyword in the search field of the widget window, the first device 100 may search for a device corresponding to the input keyword from the address book received from the second device 200. In addition, when a file stored in the first device 100 moves to the widget window, a text for guiding a keyword for searching for a device to which the file is transmitted may be displayed in the widget window.

In this case, the keyword input by the user may include a pre-set tag value, and the first device 100 may filter some of devices included in the address book based on the tag value. In addition, the tag value may be identified based on types of data transmission services supported by the devices included in the address book. For example, the tag value is a prefix value, wherein a prefix 'A' is used to search for devices in which Twitter® is installed, and a prefix 'B' is used to search for devices in which Facebook® is installed. Thus, when 'A Tom' is input in the widget window, the first device 100 may search for devices of which a user name is 'Tom' from among the devices in which Twitter® is installed. In addition, when 'B friends' is input in the widget window, the first device 100 may search for devices of users who are friends of the user of the first device 100 from among the devices in which Facebook® is installed.

In addition, in operation S408, the first device 100 may provide a keyword input through the widget window to the second device 200 and receive device information corresponding to users found based on the keyword from the second device 200. In more detail, when the user inputs a keyword through the widget window, the first device 100 may provide the input keyword to the second device 200. Also, the second device 200 may search for users from the address book stored in the second device 200 by using the received keyword and provide device information corresponding to the found users to the first device 100.

In operation S410, the first device 100 transmits data to be provided to the third device 300 to the second device 200. The first device 100 may provide a text message input into the first device 100 to the second device 200. When the third device 300 is searched for and selected through the widget window of the first device 100, a chatting window for transmitting and receiving messages between the first device 100 and the third device 300 may be generated. In addition, when a text message is input by the user through the generated chatting window, the first device 100 may transmit the text message to the second device 200.

In addition, in operation S410, the first device 100 may transmit information regarding whether to accept a call, which is input in the first device 100, to the second device 200. When the third device 300 requests the second device 200 for a call, the second device 200 may provide outgoing call information of the third device 300 to the first device 100. In this case, the first device 100 may provide information regarding a call connection to the third device 300 to the second device 200. For example, when the user rejects the call with the third device 300, the first device 100 may provide a call reject message to the second device 200. For example, an input window for inputting a message related to a call connection may be displayed on the first device 100, and the user may input a message, such as "it is hard to accept your call because of meeting," through the input window.

In addition, in operation S410, the first device 100 may provide a predetermined file stored in the first device 100 to the second device 200. When the user selects the predetermined file stored in the first device 100, the selected file may be provided to the second device 200. For example, the user may select the predetermined file stored in the first device 100, move the selected file to the widget window, search for the third device 300 through the widget window, and provide an identification value of the found third device 300 and the selected file to the second device 200.

In operation S412, the second device 200 provides the data received from the first device 100 to the third device 300. The second device 200 may provide at least one of the text message, the information regarding a call connection, and the file received from the first device 100 to the third device 300. In this case, the second device 200 may receive information (e.g., a telephone number, an email address, etc.) regarding the third device 300 selected by the first device 100 from the first device 100 and transmit the data to the third device 300 based on the received device information.

A device searching method for data transmission according to an exemplary embodiment of the present invention will now be described with reference to FIG. 5.

Figure 5:
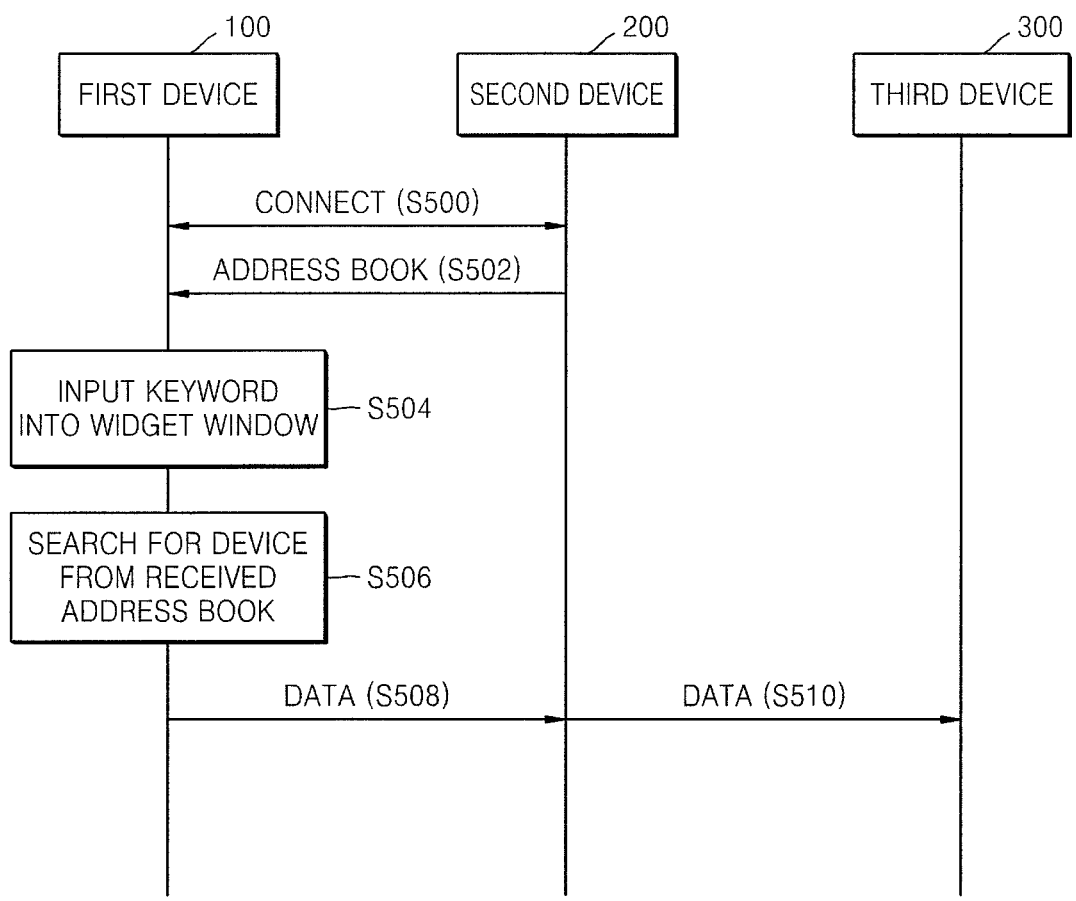
FIG. 5 is a signaling diagram of a device searching method for data transmission, according to an exemplary embodiment of the present invention.

FIG. 5 is a signaling diagram of a device searching method for data transmission, according to an exemplary embodiment of the present invention.

Referring to FIG. 5, in operation S500, the first device 100 and the second device 200 are connected to each other. In operation S500, the first device 100 may be connected to the second device 200 based on a user input through the widget window. For example, when the user selects the tethering button of the widget window, the first device 100 may request the second device 200 for a connection. However, the first device 100 is not limited thereto, and even though a separate user input is not received, when the widget window is executed, the first device 100 may request the second device 200 for the connection.

In operation S502, the first device 100 receives an address book from the second device 200. The address book received from the second device 200 may include at least one of, for example, a telephone number, a user name, a user email address, and a SNS account of at least one device. The address book received from the second device 200 may be used for the first device 100 to search for a device for data transmission by using the widget window. In addition, the first device 100 may receive information regarding applications installed in devices corresponding to a list included in the address book from the second device 200. In addition, the information regarding the applications installed in the devices may be included in the address book.

In operation S504, the first device 100 receives a keyword input for a device search through the widget window. The widget window may include a search field for the device search and may be displayed in the pre-set area of the background screen of the first device 100. In addition, a guidance text for the device search may be displayed in the search field of the widget window. The guidance text for the device search may be displayed when a predetermined file is selected and moves to the widget window in the first device 100, but the present invention is not limited thereto.

In addition, in operation S504, the first device 100 may receive a keyword input by the user through the widget window. The keyword may include a user name or telephone number of a device. In addition, the keyword may include a predetermined tag value. For example, the tag value may be a prefix value, and devices to be searched for may be identified based on the tag value. For example, a tag value '@' may be used to search for a group name, and a tag value '#' may be used to search for a telephone number. In addition, according to the tag value, some of devices listed in the address book may be filtered. For example, a tag value '$' may be used to filter latest contact information with which a call is transmitted and received from among the listed devices, a tag value 'A' may be used to filter devices in which Twitter® is installed, and a tag value 'B' may be used to filter devices in which Facebook® is installed.

In addition, the widget window may be used to search for content and messages stored in the first device 100 and the second device 200. In this case, a tag value '!' may be used to search for a music file, a tag value '!!' may be used to search for a video file, and a tag value '&' may be used to search for a message.

Also, the widget window may be used to search for a surrounding device connected to the first device 100. For example, a tag value '^' may be used to search for a surrounding device by using a Digital Living Network Alliance (DLNA).

In operation S506, the first device 100 searches for a device based on the input keyword. In operation S506, the first device 100 may search for a device corresponding to the input keyword from the address book received from the second device 200. In this case, the first device 100 may filter devices by using the tag value included in the keyword. For example, a prefix 'A' may be used to search for devices in which Twitter® is installed, and a prefix 'B' may be used to search for devices in which Facebook® is installed. Thus, when 'A Tom' is input through the widget window, the first device 100 may filter the devices in which Twitter® is installed and search for devices of which a user name is 'Tom' from among the filtered devices. In addition, when 'B friends' is input through the widget window, the first device 100 may filter devices in which Facebook® is installed and search for devices of users who are friends of the user of the first device 100 from among the filtered devices.

In operation S508, the first device 100 provides data to the second device 200. In operation S508, the first device 100 may provide data to be provided to the found third device 300 to the second device 200. For example, the first device 100 may provide a text message input by the user or a file selected by the user to the second device 200. In addition, the first device 100 may provide to the second device 200 device information of the third device 300 to which the data is transmitted. The device information may include, for example, a device user name, a device telephone number, and a device user email address, but the present invention is not limited thereto.

In operation S510, the second device 200 transmits the data received from the first device 100 to the third device 300. In operation S510, the second device 200 may transmit the data received from the first device 100 to the third device 300 based on the device information of the third device 300, which is received from the first device 100.

A method of transmitting data between devices by using a widget window according to an exemplary embodiment of the present invention will now be described with reference to FIG. 6.

Figure 6:
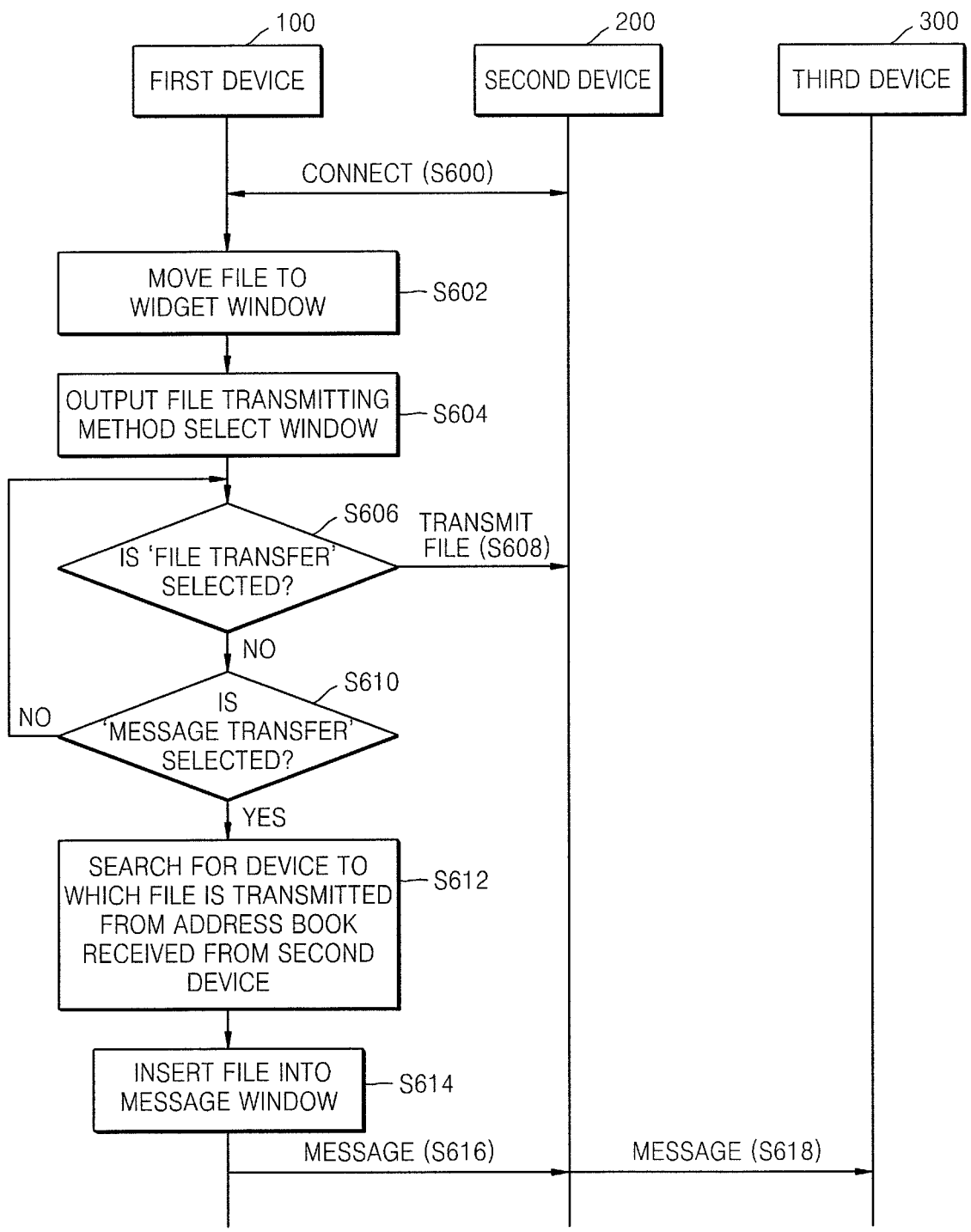
FIG. 6 is a signaling diagram of a method of transmitting data between devices by using a widget window, according to an exemplary embodiment of the present invention.

FIG. 6 is a signaling diagram of a method of transmitting data between devices by using a widget window, according to an exemplary embodiment of the present invention.

Referring to FIG. 6, in operation S600, the first device 100 and the second device 200 are connected to each other. In operation S600, the first device 100 may be connected to the second device 200 based on a user input through the widget window. For example, when the user selects the tethering button of the widget window, the first device 100 may request the second device 200 for a connection. However, the first device 100 is not limited thereto, and even though a separate user input is not received, when the widget window is executed, the first device 100 may request the second device 200 for the connection.

In operation S602, the first device 100 moves a predetermined file to the widget window based on a user input. In operation S602, the first device 100 may move a file selected by a user input to the widget window. The user may select the predetermined file stored in the first device 100 and move the selected file to the widget window through a Drag & Drop operation.

In operation S604, the first device 100 outputs a select list for selecting a file transmitting method on the screen. In operation S604, the first device 100 may display on the screen a select window including a 'file transfer' list for directly transmitting a file and a 'message transfer' list for transmitting a file through a message window.

In operation S606, the first device 100 determines whether 'file transfer' is selected from a file transmitting method select window. If 'file transfer' is selected according to a user input in operation S606, the first device 100 directly transmits the file to the second device 200 in operation S608.

Otherwise, if 'file transfer' is not selected in operation S606, the first device 100 determines in operation S610 whether 'message transfer' is selected from the file transmitting method select window. If 'message transfer' is not selected in operation S610, the method returns to operation S606.

If 'message transfer' is selected in operation S610, the first device 100 searches for a device for transmission in operation S612. In operation S612, the first device 100 may receive a keyword for searching for the device for transmission. In addition, the first device 100 may search for the device for transmission by using the keyword input by the user.

In this case, the keyword may include a user name or telephone number of the device for transmission. In addition, the keyword may include a predetermined tag value. The tag value may be, for example, a prefix value and may be identified according to types of data transmission services supported by devices included in the address book, but the present invention is not limited thereto. In addition, the first device 100 may filter devices by using the tag value included in the keyword. For example, a prefix 'A' may be used to search for devices in which Twitter® is installed, and a prefix 'B' may be used to search for devices in which Facebook® is installed. Thus, when 'A Tom' is input through the widget window, the first device 100 may filter the devices in which Twitter® is installed and search for devices of which a user name is 'Tom' from among the filtered devices. In addition, when 'B friends' is input through the widget window, the first device 100 may filter devices in which Facebook® is installed and search for devices of users who are friends of the user of the first device 100 from among the filtered devices. In addition, the first device 100 may select at least one of the found devices.

In operation S614, the first device 100 inserts the file into a message transfer window. In operation S614, the first device 100 may generate a message transfer window for the device found in operation S612 and insert the file to the generated message transfer window.

In addition, the first device 100 may determine based on a state of the second device 200 whether the file transmitting method select window is displayed. For example, when the second device 200 displays the message transfer window, the first device 100 may not display the file transmitting method select window. In addition, the first device 100 may provide the selected file to the second device 200 to insert the selected file into the message transfer window displayed on the second device 200.

In addition, the first device 100 may determine based on a state of the first device 100 whether the file transmitting method select window is displayed. For example, when the first device 100 displays the message transfer window, the first device 100 may not display the file transmitting method select window. In addition, the first device 100 may insert the selected file into the message transfer window displayed on the first device 100.

In operations S616 and S618, the first device 100 provides the selected file to the third device 300 via the second device 200. The third device 300 may be the device found in operation S612.

A method of transmitting data between devices by using a widget window according to another exemplary embodiment of the present invention will now be described with reference to FIG. 7.

Figure 7:
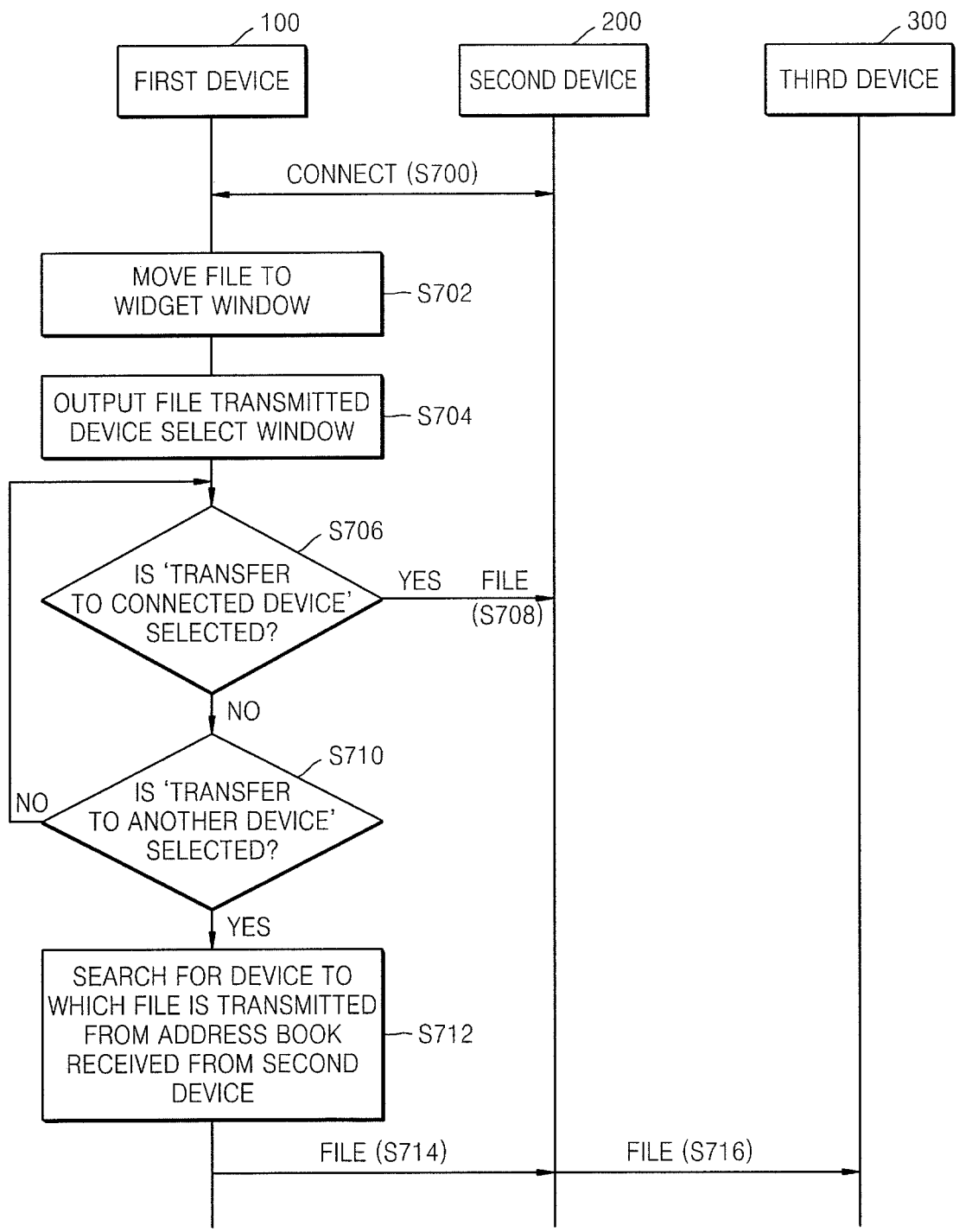
FIG. 7 is a signaling diagram of a method of transmitting data between devices by using a widget window, according to another exemplary embodiment of the present invention.

FIG. 7 is a signaling diagram of a method of transmitting data between devices by using a widget window, according to another exemplary embodiment of the present invention.

Referring to FIG. 7, in operation S700, the first device 100 and the second device 200 are connected to each other. In operation S700, the first device 100 may be connected to the second device 200 based on a user input through the widget window. For example, when the user selects the tethering button of the widget window, the first device 100 may request the second device 200 for a connection. However, the first device 100 is not limited thereto, and even though a separate user input is not received, when the widget window is executed, the first device 100 may request the second device 200 for the connection.

In operation S702, the first device 100 moves a predetermined file to the widget window based on a user input. In operation S702, the first device 100 may move a file selected by a user input to the widget window. The user may select the predetermined file stored in the first device 100 and move the selected file to the widget window through a Drag & Drop operation.

In operation S704, the first device 100 outputs a select list for selecting a device for file transmission on the screen. In operation S704, the first device 100 may display on the screen a select window including a 'transfer to connected device' list for transmitting a file to the second device 200 and a 'transfer to another device' list for transmitting a file to another device not connected to the first device 100.

In operation S706, the first device 100 determines whether 'transfer to connected device' is selected from a file transmitted device select window. If 'transfer to connected device' is selected according to a user input in operation S706, the first device 100 directly transmits the file to the second device 200 in operation S708.

Otherwise, if 'transfer to connected device' is not selected in operation S706, the first device 100 determines in operation S710 whether 'transfer to another device' is selected from the file transmitted device select window. If 'transfer to another device' is not selected in operation S710, the method returns to operation S706.

If 'transfer to another device' is selected in operation S710, the first device 100 searches for a device for file transmission in operation S712. In operation S712, the first device 100 may receive a keyword for searching for the device for file transmission. In addition, the first device 100 may search for the device for file transmission by using the keyword input by the user.

In operations S714 and S716, the first device 100 provides the selected file to the third device 300 via the second device 200. The third device 300 may be the device found in operation S712.

A method of receiving and processing outgoing call information from the third device 300 in the first device 100 according to an exemplary embodiment of the present invention will now be described with reference to FIG. 8.

Figure 8:
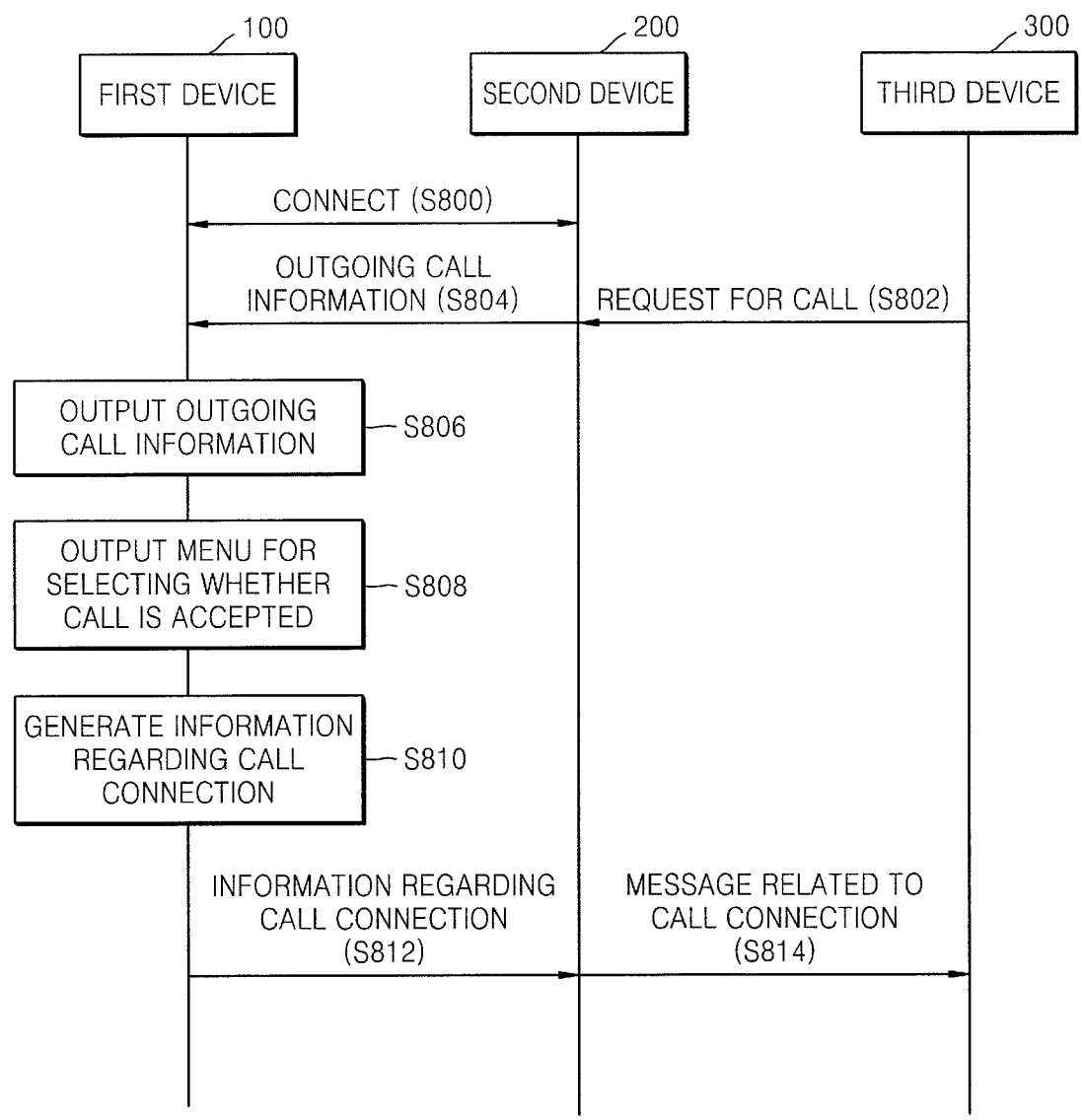
FIG. 8 is a signaling diagram of a method of receiving and processing outgoing call information from a third device in a first device, according to an exemplary embodiment of the present invention.

FIG. 8 is a signaling diagram of a method of receiving and processing outgoing call information from the third device 300 in the first device 100, according to an exemplary embodiment of the present invention.

Referring to FIG. 8, in operation S800, the first device 100 and the second device 200 are connected to each other. In operation S800, the first device 100 may be connected to the second device 200 based on a user input through the widget window. For example, when the user selects the tethering button of the widget window, the first device 100 may request the second device 200 for a connection. However, the first device 100 is not limited thereto, and even though a separate user input is not received, when the widget window is executed, the first device 100 may request the second device 200 for the connection.

In operation S802, the third device 300 requests the second device 200 for a call connection. When a user of the third device 300 tries to call the second device 200 by using the third device 300, the third device 300 may request the second device 200 for the call connection. In addition, the second device 200 may receive a call signal including outgoing call information from the third device 300.

In operation S804, the second device 200 provides the outgoing call information to the first device 100. In operation S804, the second device 200 may provide the outgoing call information received from the third device 300 to the first device 100. The second device 200 may receive a telephone number from the third device 300, detect a user name and a group name corresponding to the received telephone number from an address book, and provide the received telephone number and the detected user name and group name to the first device 100.

In operation S806, the first device 100 outputs the received outgoing call information of the third device 300. In operation S806, the first device 100 may display the outgoing call information on the screen through a separate popup window.

In operation S808, the first device 100 outputs on the screen a select menu for selecting whether the call is accepted. In operation S808, the first device 100 may display the select menu in the popup window for displaying the outgoing call information. In addition, the select menu for selecting whether the call is accepted may include, for example, 'accept', 'reject', and 'reject with message', but the present invention is not limited thereto.

In operation S810, the first device 100 generates information regarding a call connection based on whether the call is accepted. The information regarding a call connection may include, for example, an accept command, a reject command, and a message related to the call connection, but the present invention is not limited thereto. In more detail, the first device 100 may determine whether to call the third device 300 based on a user select input regarding whether the call is accepted and may generate the accept command based on whether the call is accepted. For example, when the user selects 'accept' from the select menu for selecting whether the call is accepted, the first device 100 may generate a command for performing the call with the third device 300. In addition, when the user selects 'reject' from the select menu for selecting whether the call is accepted, the first device 100 may generate a command for rejecting the call with the third device 300.

In addition, when the user selects 'reject with message' from the select menu for selecting whether the call is accepted, the first device 100 may display a message input window on the screen and generate a message related to whether the call is connected based on a user input through the message input window. For example, the first device 100 may generate a message, such as "I cannot accept the call because of meeting," based on the user input through the message input window. The message input window may be separately displayed, but the present invention is not limited thereto, and the message input window may be displayed by being included in the popup window for displaying the outgoing call information.

In operation S812, the first device 100 provides the information regarding a call connection to the second device 200. The first device 100 may provide at least one of the accept command, the reject command, and the message related to the call connection to the second device 200. When the first device 100 provides the accept command to the second device 200, the second device 200 may perform the call by being connected to the third device 300.

In operation S814, the second device 200 provides the message related to the call connection to the third device 300. When the first device 100 provides the reject command to the second device 200, the second device 200 may disconnect the call connection. In addition, the second device 200 may provide the message received from the first device 100 to the third device 300.

A method of receiving a capture screen from the second device 200 in the first device 100 according to an exemplary embodiment of the present invention will now be described with reference to FIG. 9.

Figure 9:
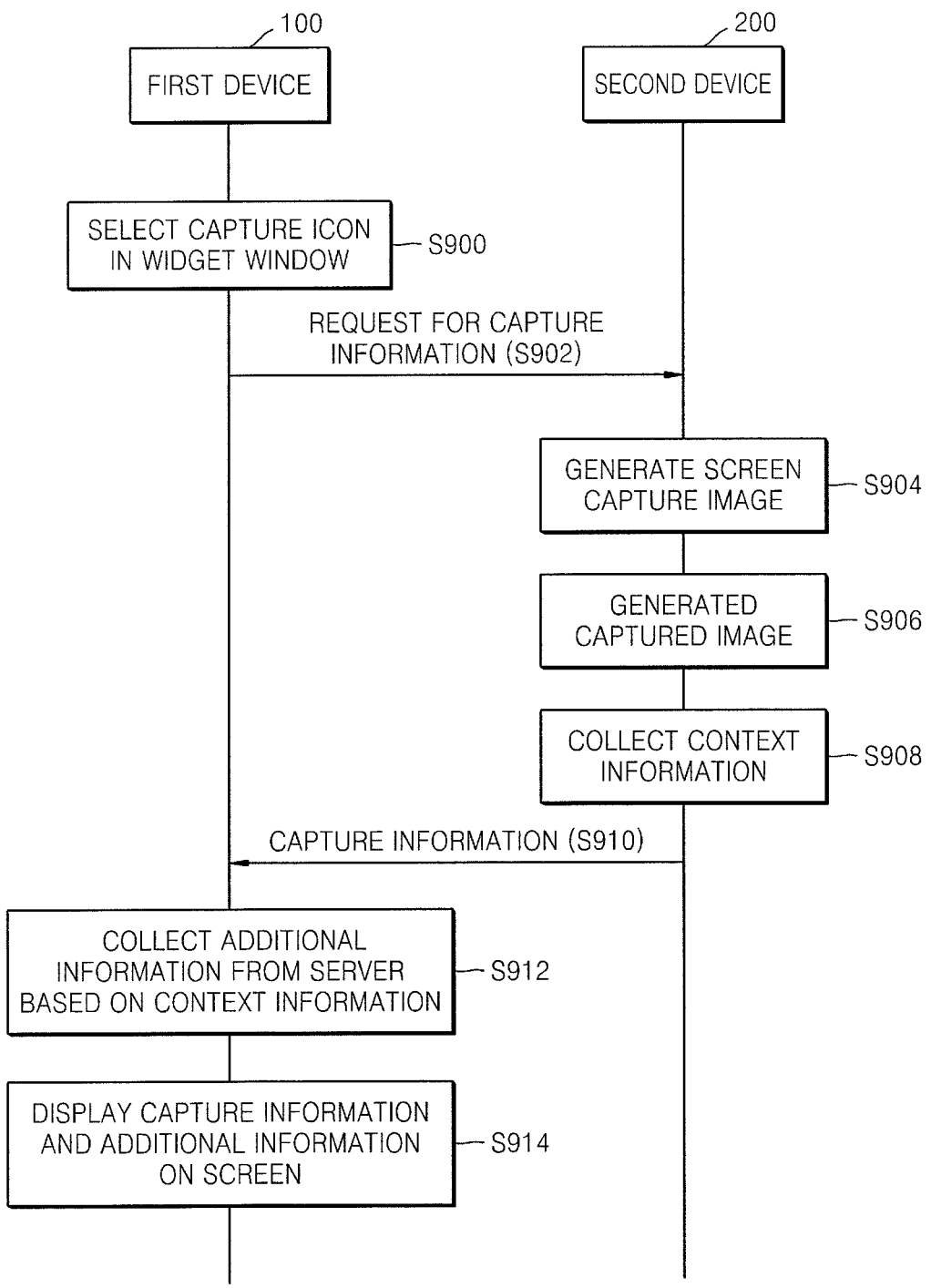
FIG. 9 is a signaling diagram of a method of receiving a capture screen from a second device in a first device, according to an exemplary embodiment of the present invention.

FIG. 9 is a signaling diagram of a method of receiving a capture screen from the second device 200 in the first device 100, according to an exemplary embodiment of the present invention.

Referring to FIG. 9, in operation S900, the first device 100 selects a capture icon in the widget window based on a user input. The capture icon may include an icon for capturing a screen of the second device 200 and an icon for taking a picture through the second device 200, but the present invention is not limited thereto. The number of capture icons in the widget window may be '1', and a select window for selecting a capture type may be displayed when the capture icon is selected. In this case, the user may select a list included in the select window and determine whether to capture the screen of the second device 200 or take a picture through the second device 200.

In operation S902, the first device 100 requests the second device 200 for capture information. In operation S902, the first device 100 may request the second device 200 for capture information including a screen capture image of the second device 200 or capture information including an image captured by the second device 200.

In operation S904, the second device 200 generates a screen capture image in response to the capture information request. When the first device 100 requests the second device 200 for the capture information including a screen capture image of the second device 200 in operation S902, the second device 200 may generate a screen capture image of the second device 200 in operation S904.

In operation S906, the second device 200 generates a captured image in response to the capture information request. When the first device 100 requests the second device 200 for the capture information including an image captured by the second device 200 in operation S902, the second device 200 may generate a captured image by using a photographing device included in the second device 200 in operation S906.

In operation S908, the second device 200 collects context information regarding at least one of the screen capture image and the captured image. The context information may include, for example, time, place, and weather, but the present invention is not limited thereto.

In operation S910, the second device 200 provides the capture information to the first device 100. The capture information may include the screen capture image, the captured image, and the context information. In addition, when the first device 100 requests the second device 200 for the capture information including a screen capture image of the second device 200, the second device 200 may provide the screen capture image and the context information to the first device 100. In addition, when the first device 100 requests the second device 200 for the capture information including an image captured by the second device 200, the second device 200 may provide the captured image and the context information to the first device 100.

In operation S912, the first device 100 collects additional information from a server (not shown) based on the received context information. In operation S912, the first device 100 may perceive the context information included in the received captured information and collect additional information corresponding to the context information. The additional information may include, for example, map information, local information, and news information, but the present invention is not limited thereto.

In operation S914, the first device 100 displays the capture information and the collected additional information on the screen thereof. The first device 100 may display at least one of the screen capture image and the captured image and simultaneously display the context information and the additional information related to the same.

A method of performing communication between devices according to an exemplary embodiment of the present invention will now be described with reference to FIG. 10.

Figures 10, 11:
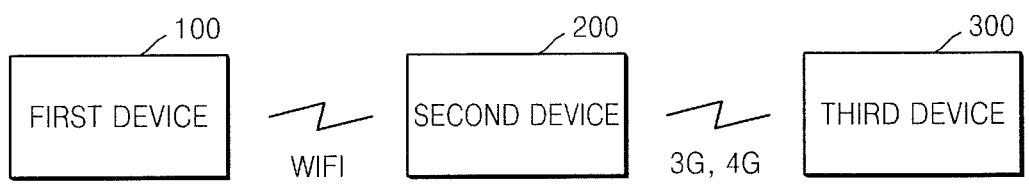
FIG. 10 is a block diagram for describing a method of performing communication between devices, according to an exemplary embodiment of the present invention.
FIG. 11 illustrates an address book table according to an exemplary embodiment of the present invention.

FIG. 10 is a block diagram for describing a method of performing communication between devices, according to an exemplary embodiment of the present invention.

Referring to FIG. 10, the first device 100 may use the wireless communication function of the second device 200 through tethering. In more detail, the first device 100 may be connected to the second device 200 by, for example, Wireless Fidelity (Wi-Fi) communication. In addition, the second device 200 and the third device may be connected to each other by using, for example, at least one of the $3^{rd}$ Generation (3G) mobile communication and the $4^{th}$ Generation (4G) mobile communication, but the present invention is not limited thereto.

In this case, the tethering function of the second device 200 may be activated based on a user input through the widget window activated in the first device 100. For example, when a predetermined area is selected from the widget window displayed on the first device 100, the first device 100 may request the second device 200 to activate the tethering function, but the present invention is not limited thereto. That is, when the widget window is activated in the first device 100, the first device 100 may request the second device 200 to activate the tethering function.

In addition, the first device 100 and the second device 200 may exchange access information for communication therebetween. When the tethering function is requested, the first device 100 and the second device 200 may exchange the access information for communication there between, but the present invention is not limited thereto.

The first device 100 may execute a widget window application for performing a device search and data transmission by using the widget window, and the first device 100 and the second device 200 may be connected to each other through the widget window application. In addition, a widget window agent included in the widget window application may be executed when the first device 100 is turned on, and when any device exists in the same Access Point (AP), the widget window application may be executed by the first device 100 to connect the first device 100 to a surrounding device. In addition, the widget window application may detect the second device 200 and connect the first device 100 to the detected second device 200. In more detail, the widget window application may detect the second device 200 located around the first device 100 and transmit an authentication code to the detected second device 200, and the second device 200 may confirm the authentication code and perform a Wi-Fi communication setup for connection to the first device 100. In addition, the second device 200 may provide an Internet Protocol (IP) value and the confirmed authentication code to the first device 100. The widget window application may authenticate the detected second device 200 and connect the first device 100 to the second device 200. Once authentication between the first device 100 and the second device 200 is performed, the first device 100 and the second device 200 may be connected to each other without another authentication.

The first device 100 and the second device 200 may be connected to each other through a USB. When the second device 200 is connected to the first device 100 through a USB cable, the widget window application of the first device 100 may execute the widget window on the screen of the first device 100 and request the second device 200 to execute the widget window application of the second device 200. In addition, when the USB cable between the first device 100 and the second device 200 is disconnected, the first device 100 and the second device 200 may be connected again through the Wi-Fi communication.

An address book table according to an exemplary embodiment of the present invention will now be described with reference to FIG. 11.

FIG. 11 illustrates an address book table according to an exemplary embodiment of the present invention.

Referring to FIG. 11, the address book table includes a shortcut number field 90, a user field 91, a telephone number field 92, a group field 93, a device field 94, and an application field 95.

A shortcut number corresponding to each telephone number is recorded in the shortcut number field 90, a user name corresponding to each telephone number is recorded in the user field 91, each telephone number is recorded in the telephone number field 92, a group name designated to each telephone number is recorded in the group field 93, and a device type corresponding to each telephone number is recorded in the device field 94. For example, a device name, such as 'Galaxy G3 or 'I-Phone', may be recorded in the device field 94, but the present invention is not limited thereto. In addition, a name of an application installed in a corresponding device is recorded in the application field 95. For example, a name of a messenger application, such as 'twitter' or 'facebook', may be recorded in the application field 95, but the present invention is not limited thereto. Such an address book may be provided from the second device 200 to the first device 100 directly or via a separate server (not shown), and the first device 100 may search for a device to which data is transmitted by using the address book.

In addition, a prefix may match with each of the device names recorded in the device field 94 and the application names recorded in the application field 95. Thus, when the user inputs a keyword for a device search, the user may input a predetermined prefix together with the keyword, and the first device 100 may filter predetermined devices by using the input prefix and perform the device search with respect to the filtered devices.

An example of searching for a device for data transmission in the first device 100 according to an exemplary embodiment of the present invention will now be described with reference to FIG. 12.

Figure 12:
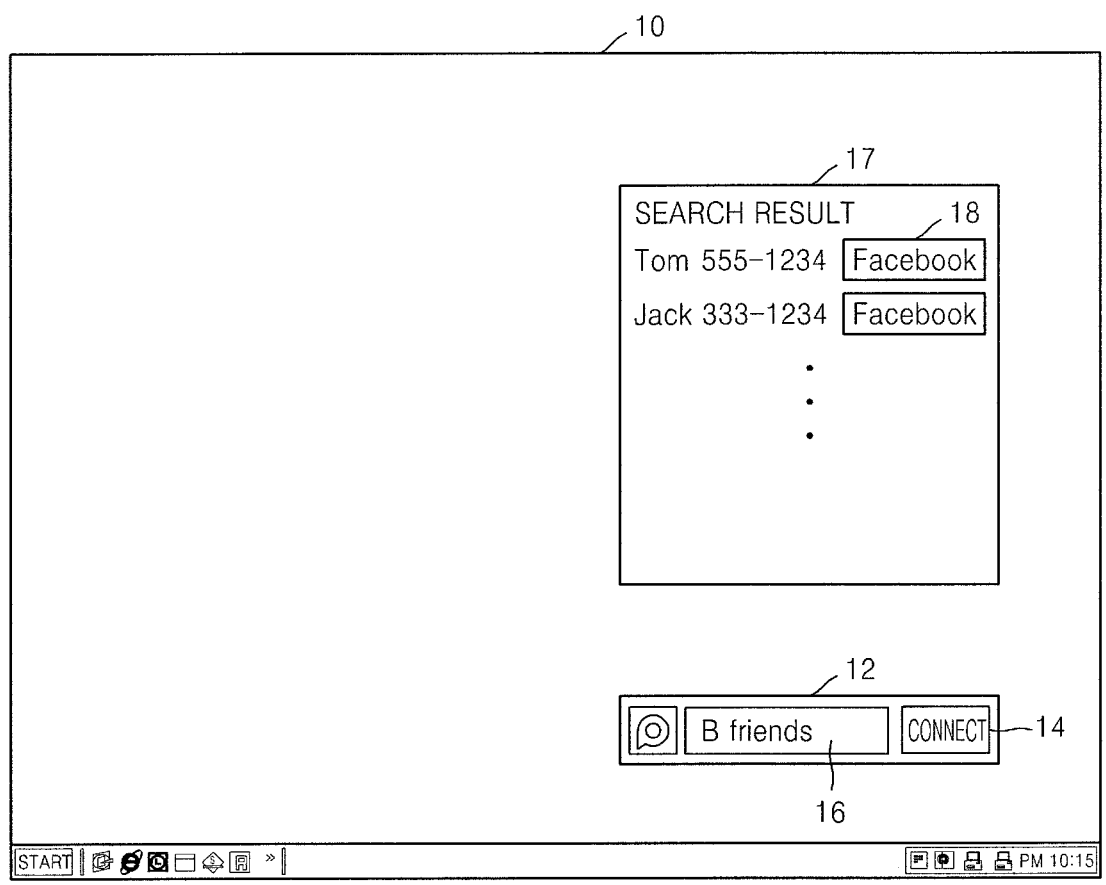
FIG. 12 illustrates a screen for searching for a device for data transmission in a first device, according to an exemplary embodiment of the present invention.

FIG. 12 illustrates a screen for searching for a device for data transmission in the first device 100, according to an exemplary embodiment of the present invention.

Referring to FIG. 12, a widget window 12 for data transmission may be displayed on a screen 10 of the first device 100, and when a predetermined button 14 is selected from the widget window 12, the first device 100 may be connected to the second device 200. However, the current exemplary embodiment is not limited thereto, and when the widget window 12 is activated in the first device 100, the first device 100 may be connected to the second device 200.

In addition, the user may search for a device to which data is transmitted by inputting a keyword in a search field 16 of the widget window 12. For example, when the user inputs 'B friends' in the search field 16, the first device 100 may first filter devices from an address book by using the prefix 'B' and then search for devices having a friendship from among the filtered devices.

In addition, the search result may be output to a separate window 17, and a type of an application installed in one of the found devices may be displayed in a predetermined area 18 as an output result. In addition, when the area 18 is selected, the application corresponding to the selected area 18 may be executed in the second device 200, and the first device 100 may transmit data to the found device via the second device 200. In this case, the first device 100 may provide a control command for executing the application and data to be transmitted to the second device 200.

An example of displaying a device search result on the widget window 12 according to an exemplary embodiment of the present invention will now be described with reference to FIG. 13.

Figure 13:
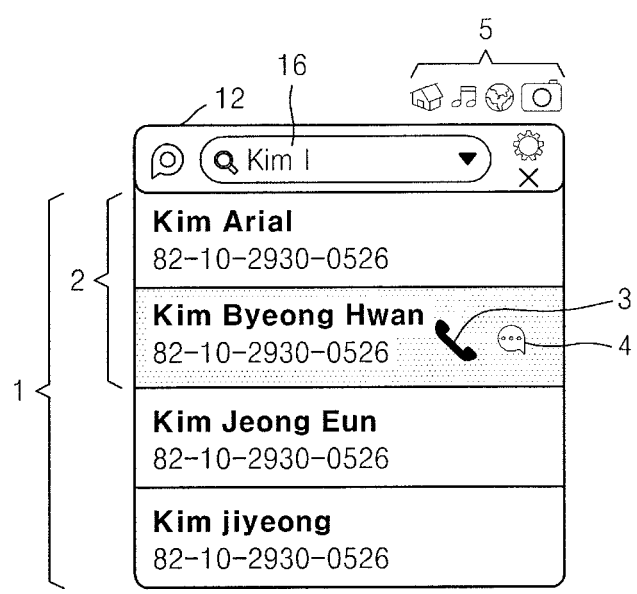
FIG. 13 illustrates a device search result displayed on a widget window, according to an exemplary embodiment of the present invention.

FIG. 13 illustrates a device search result displayed on the widget window 12, according to an exemplary embodiment of the present invention.

Referring to FIG. 13, when a keyword 'Kim' is input in the search field 16 of the widget window 12, a device search list 1 corresponding to the keyword 'Kim' may be extended and displayed below the widget window 12. In addition, the device search list 1 may include user names and corresponding telephone numbers of found devices, and a device search list 2 recently used by the user may be discriminately displayed in the device search list 1. For example, the device search list 2 recently used by the user may be discriminately displayed on the top of the device search list 1.

In addition, the device search list 1 may include a 'make a call' icon 3 and a message transfer icon 4. When the user selects the 'make a call' icon 3, the first device 100 may request the second device 200 to make a call to a device of an item including the 'make a call' icon 3. In addition, when the user selects the message transfer icon 4, a message transfer window (not shown) may be displayed on a screen of the first device 100, and the first device 100 may transmit a message input through the message transfer window to the third device 300 via the second device 200.

A plurality of icons 5 for performing predetermined functions in the first device 100 may be displayed above the widget window 12. The plurality of icons 5 may include, for example, an icon for moving to a home screen, an icon for playing music, an icon for executing an Internet browser, and an icon for requesting for a capture image. When the user selects the icon for requesting for a capture image, the first device 100 may request the second device 200 for a screen capture image of the second device 200. In addition, when the user selects the icon for requesting for a capture image, the first device 100 may request the second device 200 for an image captured by the second device 200.

An example of transmitting a file in a file transmitting method selected in the first device 100 through the widget window 12 according to an exemplary embodiment of the present invention will now be described with reference to FIG. 14.

Figure 14:
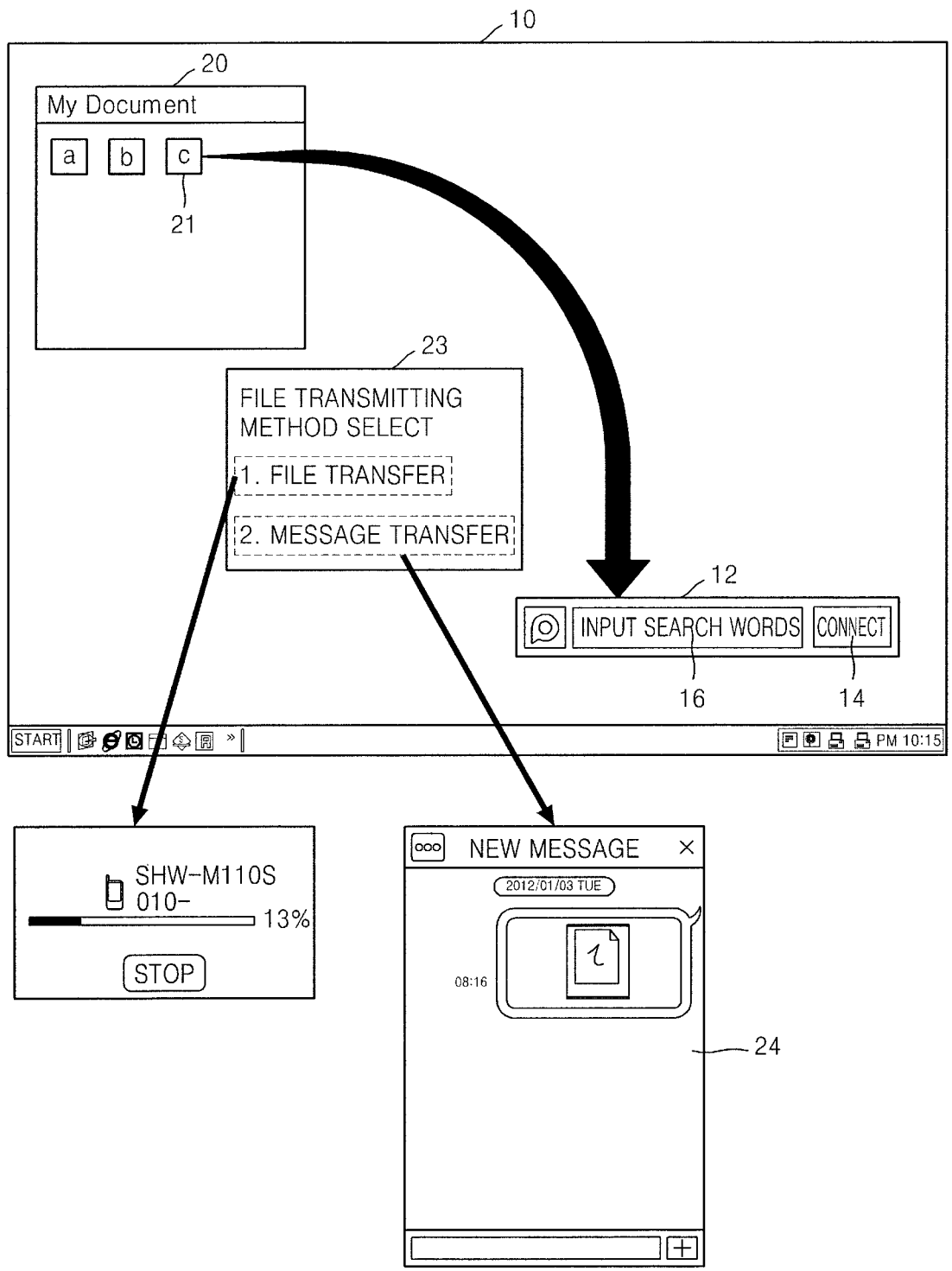
FIG. 14 shows an example of transmitting a file in a file transmitting method selected in a first device through a widget window, according to an exemplary embodiment of the present invention.

FIG. 14 shows an example of transmitting a file in a file transmitting method selected in the first device 100 through the widget window 12, according to an exemplary embodiment of the present invention.

Referring to FIG. 14, when the user selects a file 21 from a folder 20 displayed on the screen 10 of the first device 100 to move the selected file 21 to the widget window 12, a select window 23 for selecting a file transmitting method may be displayed on the screen 10. In addition, the select window 23 may include a list for directly transmitting a file and a list for transmitting a file through a message.

For example, the select window 23 may include a select list such as 'file transfer' and 'message transfer'. When 'file transfer' is selected from the select list, the first device 100 may provide the selected file 21 to the second device 200 without a separate process. In addition, when 'message transfer' is selected from the select list, a guidance text for inputting a keyword may be displayed in the search field 16 of the widget window 12. Thereafter, the user may input a keyword in the search field 16 to search for a device, and the second device 200 may generate a message transfer window 24 for the found device and insert the selected file 21 into the generated message transfer window 24. In addition, the first device 100 may provide the file 21 inserted into the message transfer window 24 to the found device via the second device 200. Here, the first device 100 may provide the file 21 inserted into the message transfer window 24 to the found device via the second device 200 when a predetermined button 14 is selected from the widget window 12.

An example of transmitting a file to a device to which the file is transmitted, which is selected in the first device 100 according to an exemplary embodiment of the present invention will now be described with reference to FIG. 15.

Figure 15:
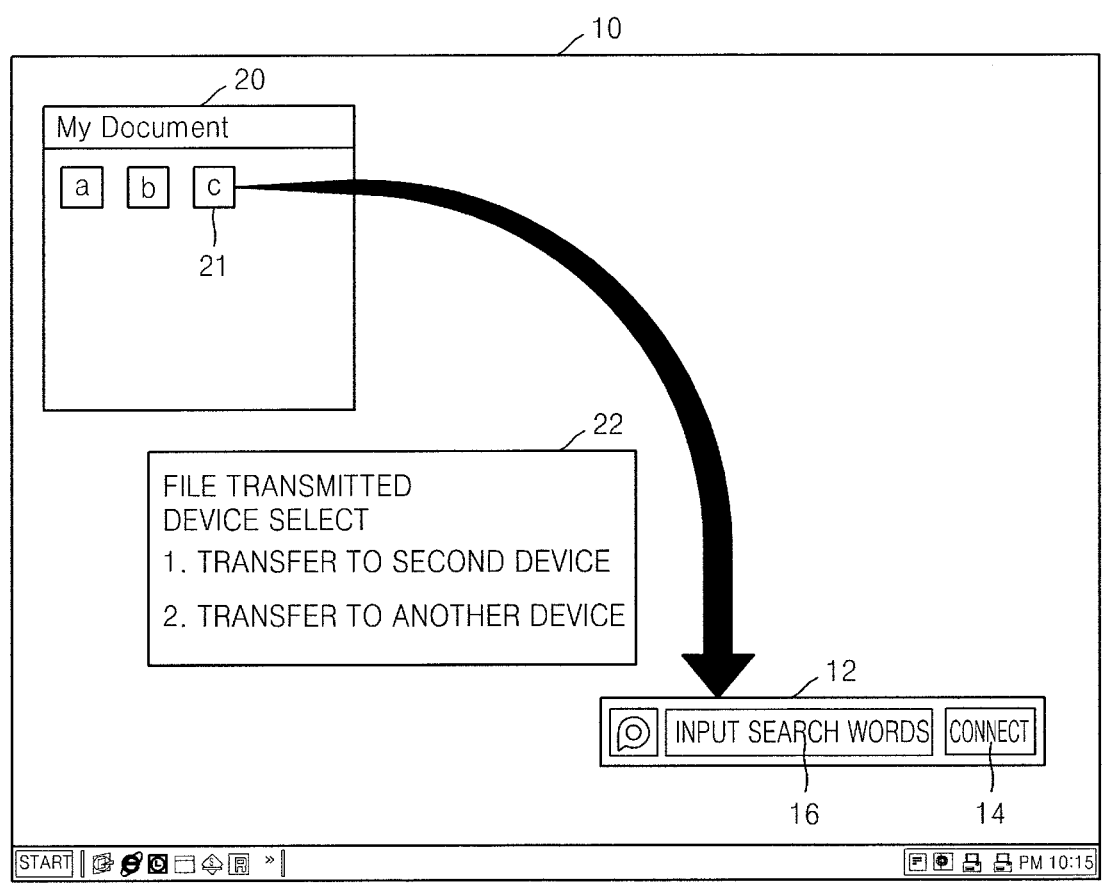
FIG. 15 shows an example of transmitting a file to a device to which the file is transmitted, which is selected in a first device, according to an exemplary embodiment of the present invention.

FIG. 15 shows an example of transmitting a file to a device to which the file is transmitted, which is selected in the first device 100, according to an exemplary embodiment of the present invention.

Referring to FIG. 15, when the user selects a file 21 from a folder 20 displayed on the screen 10 of the first device 100 to move the selected file 21 to the widget window 12, a select window 22 for selecting a device to which the file 21 is transmitted may be displayed on the screen 10. In addition, the select window 22 may include a list for selecting the second device 200 and a list for selecting the third device 300 not connected to the first device 100.

For example, the select window 22 may include a device select list such as 'transfer to second device' and 'search for another device'. When 'transfer to second device' is selected from the device select list, the first device 100 may provide the selected file 21 to the second device 200 without a separate process. In addition, when 'search for another device' is selected (i.e., when the third device 300 is selected) from the device select list, a guidance text for inputting a keyword may be displayed in the search field 16 of the widget window 12. Thereafter, the user may input a keyword in the search field 16 as shown in FIG. 14 to search for a device, and the first device 100 may provide the selected file 21 to the found third device 300 via the second device 200. Here, the first device 100 may provide the selected file 21 to the found third device 300 via the second device 200 when a predetermined button 14 is selected from the widget window 12.

Figure 16:
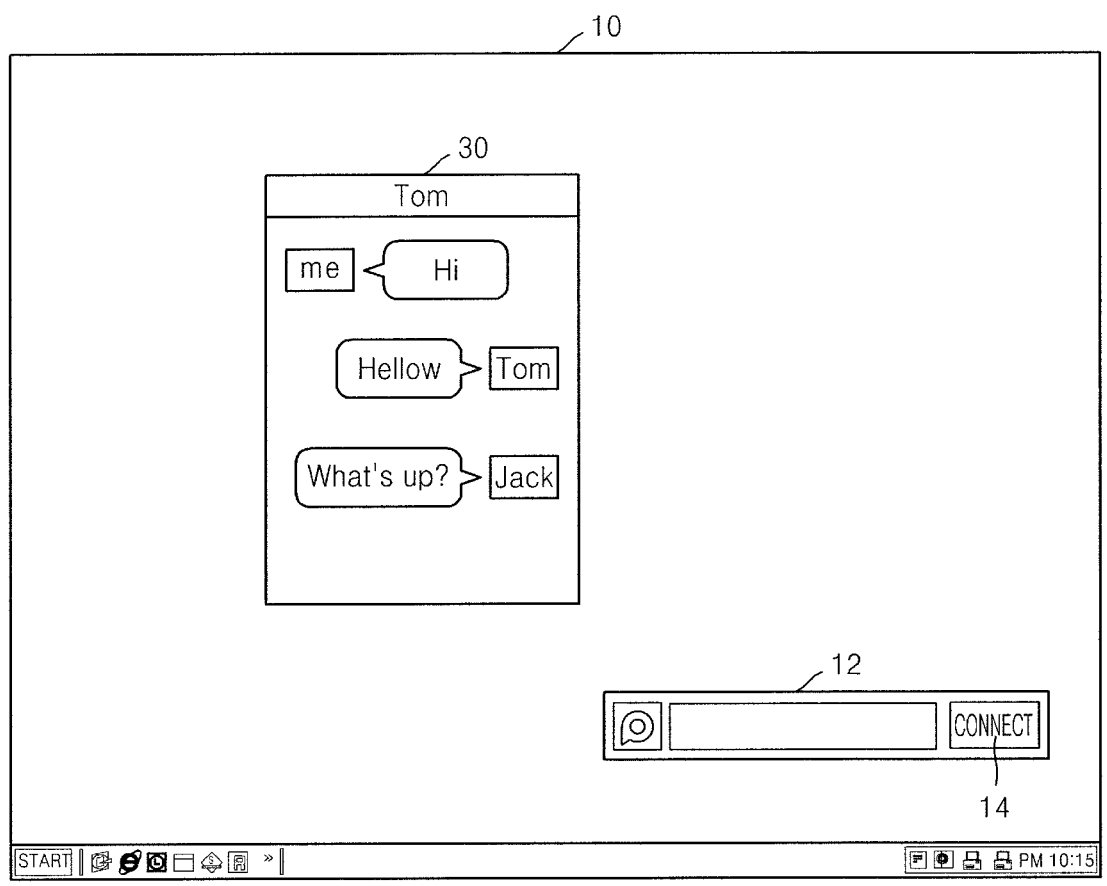
FIG. 16 shows an example of transmitting a message in a first device, according to an exemplary embodiment of the present invention.

FIG. 16 shows an example of transmitting a message in the first device 100, according to an exemplary embodiment of the present invention.

Referring to FIG. 16, when the second device 200 receives a message from the third device 300, the second device 200 may provide the received message to the first device 100, and the first device 100 may display the received message in a message window 30 on the screen 10. In addition, the user may input a message by using the message window 30, and the input message may be provided to the third device 300 via the second device 200. In addition, the user may search for another device by using the widget window 12 and provide a message to the found device through the message window 30. Here, the user may provide a message to the found device through the message window 30 without selecting a predetermined button 14 from the widget window 12.

Figure 17:
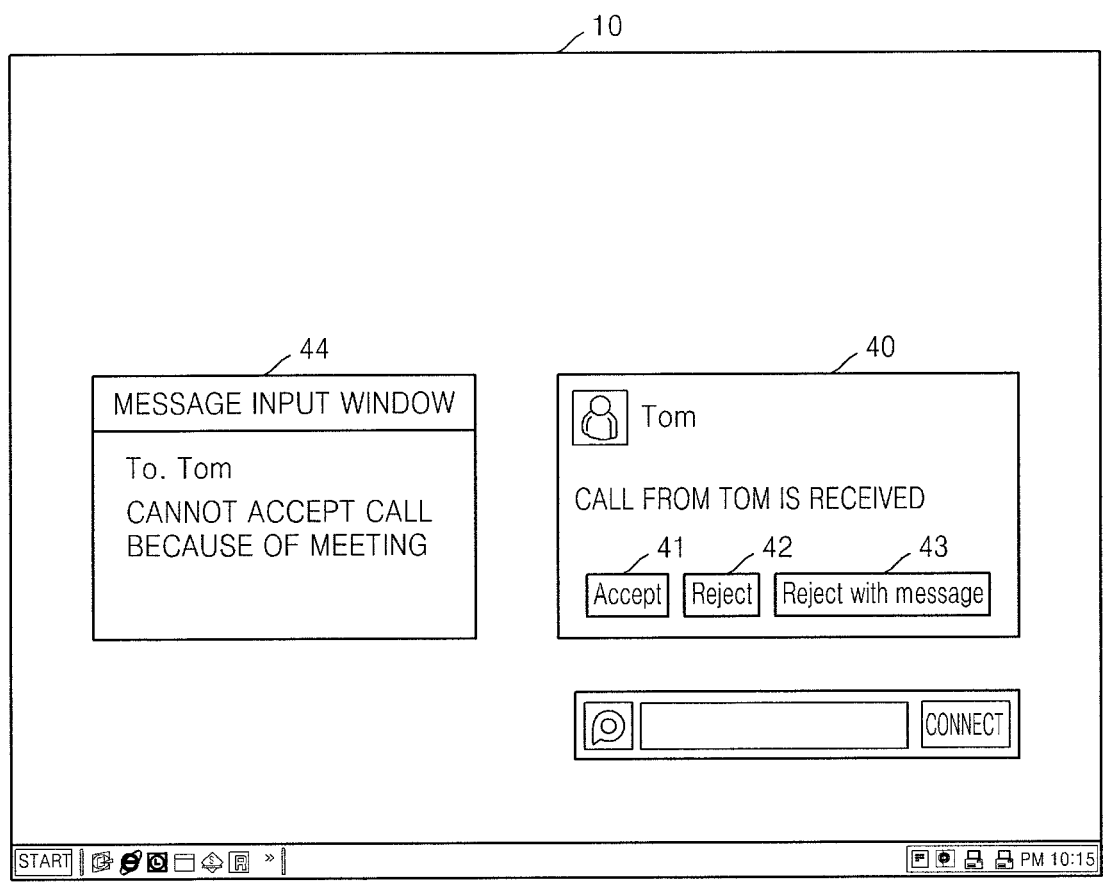
FIG. 17 shows an example of displaying outgoing call information of a third device through a first device and generating information regarding a call connection with the third device, according to an exemplary embodiment of the present invention.

FIG. 17 shows an example of displaying outgoing call information of the third device 300 through the first device 100 and generating information regarding a call connection with the third device 300, according to an exemplary embodiment of the present invention.

Referring to FIG. 17, when the third device 300 tries a call connection to the second device 200, the second device 200 may provide outgoing call information of the third device 300 to the first device 100. In addition, the first device 100 may receive the outgoing call information and display the received outgoing call information in an incoming call notice window 40 on the screen 10. Thereafter, the user may select an 'accept' button 41, a 'reject' button 42, or a 'reject with message' button 43 to determine whether the incoming call is accepted, and the first device 100 may generate information regarding a call connection based on a select of the user. For example, when the user selects the 'accept' button 41, the first device 100 may generate a call accept command and provide the generated call accept command to the second device 200.

In addition, when the user selects the 'reject' button 42, the first device 100 may generate a call reject command and provide the generated call reject command to the second device 200.

In addition, when the user selects the 'reject with message' button 43, the first device 100 may generate a call reject command, provide the generated call reject command to the second device 200, generate a separate message input window 44 for receiving a user input related to the incoming call, and display the message input window 44 on the screen 10. The user may input a message, for example, "cannot accept the call because of meeting" in the message input window 44, and the first device 100 may provide the input message to the third device 300 via the second device 200.

Figure 18:
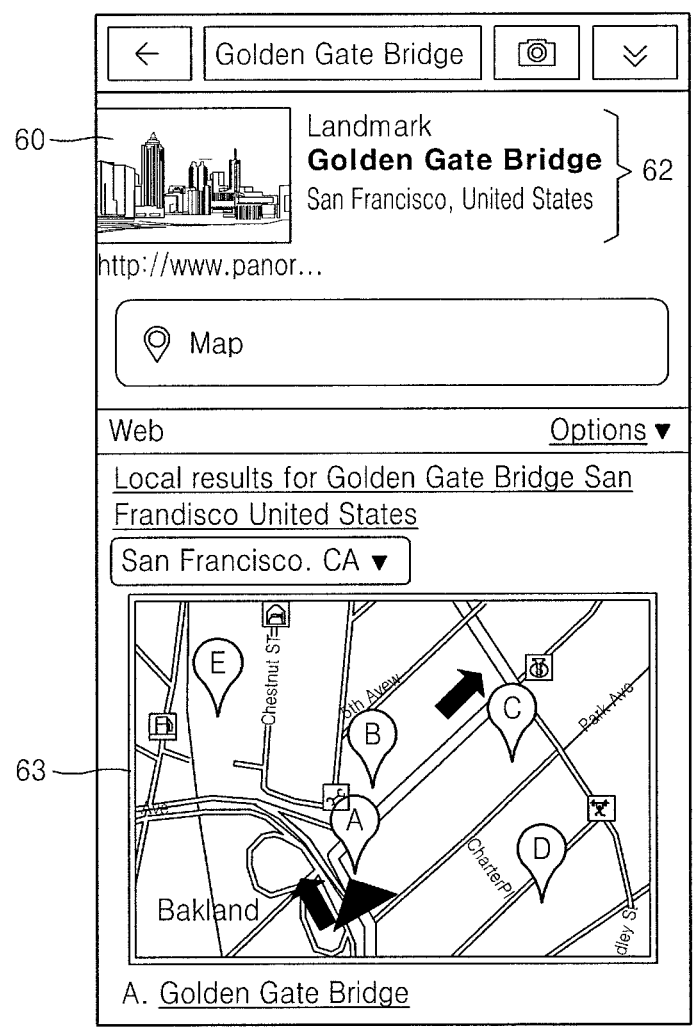
FIG. 18 shows an example of displaying capture information and additional information in a first device, according to an exemplary embodiment of the present invention.

FIG. 18 shows an example of displaying capture information and additional information in the first device 100, according to an exemplary embodiment of the present invention.

Referring to FIG. 18, when the first device 100 requests the second device 200 for a capture image in response to a selection of a camera icon in a widget window, the second device 200 may provide capture information including a capture image to the first device 100, and the first device 100 may collect additional information from a server (not shown) by using context information included in the capture information.

In addition, the capture information and the additional information may be displayed as shown in FIG. 18. An image 60 captured by the second device 200, location information 62 regarding a capturing place, and map information 63 regarding the capturing place may displayed on a screen of the first device 100.

Figure 19:
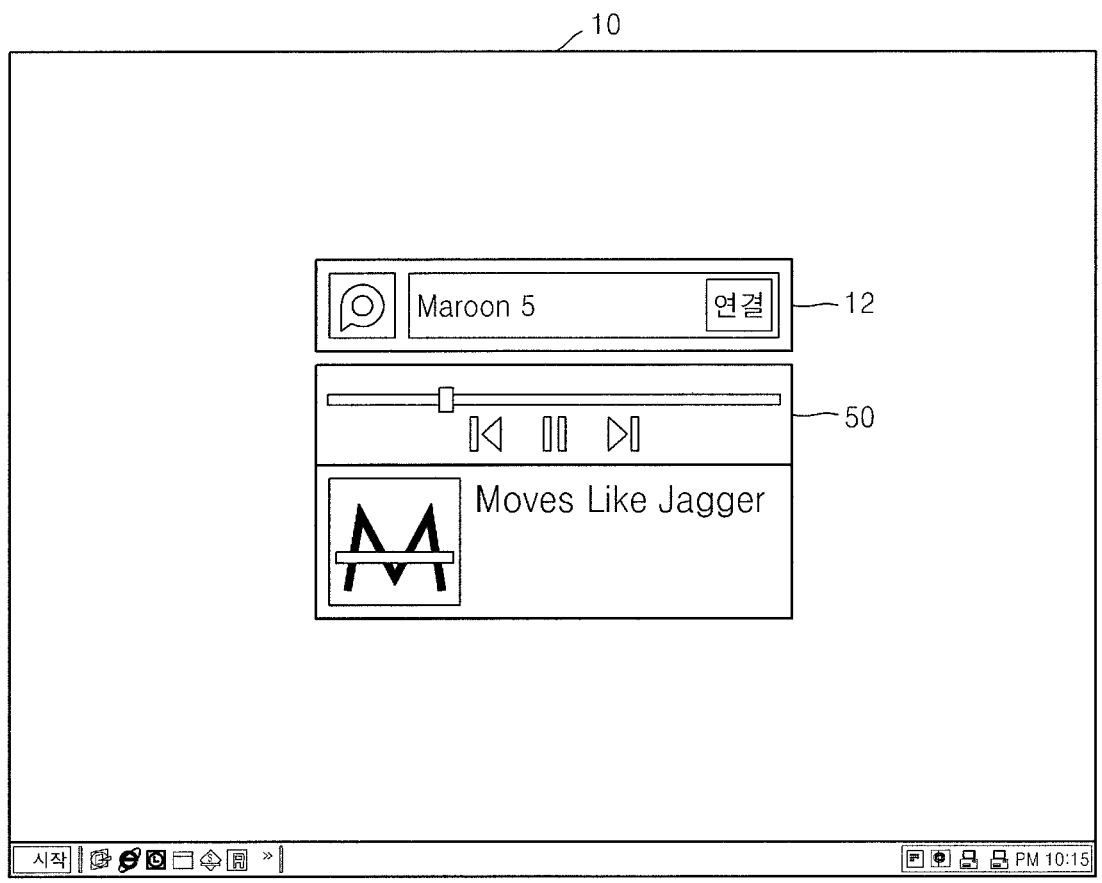
FIG. 19 shows an example of receiving and outputting content reproduced by a second device in a first device, according to an exemplary embodiment of the present invention.

FIG. 19 shows an example of receiving and outputting content reproduced by the second device 200 in the first device 100, according to an exemplary embodiment of the present invention.

Referring to FIG. 19, when the user selects a pre-set button in the widget window 12 displayed on the screen 10 of the first device 100, content being executed by the second device 200 may be provided to the first device 100. The second device 200 may stream the content to the first device 100 in real-time, and the first device 100 may execute a predetermined application 50 according to a type of the received content to reproduce the received content.

According to the exemplary embodiments of the present invention, a device to which data is transmitted may be searched for by using an address book stored in another device.

In addition, a device to which data is transmitted may be searched for by using an address book stored in another device through a widget window displayed on a device.

An exemplary embodiment of the present invention may be implemented in a form of a non-transitory recording medium including computer-executable instructions such as a program module executed by a computer. The non-transitory computer-readable recording medium may be an arbitrary available medium, which can be accessed by a computer, and includes volatile and nonvolatile media and separate- and inseparate-types media. In addition, the non-transitory computer-readable recording medium may include computer storage media and communication media. The non-transitory computer storage media include volatile, nonvolatile, separate-type, and inseparate-type media implemented by an arbitrary method or technology for storing information, such as computer-readable instructions, data structures, program modules, and other data. The communication media typically include computer-readable instructions, data structures, and program modules.

The description of the exemplary embodiments of the present invention are for illustration, and it will be understood by those of ordinary skill in the art that various changes in another concrete form may be easily made therein without changing the technical spirit or essential features of the present invention. Therefore, it should be understood that the exemplary embodiments are illustrative in all aspects and not for limitation.

That is, while the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A first device for data transmission, the first device comprising:
    a display;
    a communicator; and
    at least one processor configured to:
        execute a widget window for searching an information,
        control to connect to a second device,
        receive, via the communicator, from the second device connected to the first device, an address book stored in the second device,
        search for information of a third device in which a predetermined application is installed from the received address book, based on a keyword input by a user through the widget window, the keyword including a pre-set tag value indicating a type of the predetermined application installed on the third device,
        control the display to display a message transfer window for the searched third device,
        select an object corresponding to data stored in the first device and insert the selected object into the message transfer window based on a user input, and
        provide, via the communicator, the data corresponding to the inserted object stored in the first device to the third device via the second device.

2. The first device of claim 1,
    wherein the at least one processor is further configured to search for the information of a user of the third device from the address book by determining whether the keyword input through the widget window includes the tag value and searching, when the keyword includes the tag value, for the user in the address book by filtering users in a user list included in the address book based on the tag value, and
    wherein the tag value is identified based on types of applications installed in the third device.

3. The first device of claim 1, wherein the communicator receives the address book from the second device when the widget window is selected based on the user input.

4. The first device of claim 1, wherein the communicator receives the address book from the second device when the keyword is input into the widget window.

5. The first device of claim 1,
    wherein the communicator receives, from the second device, outgoing call information of a communication terminal when the communication terminal requests the second device for a call, and
    wherein the outgoing call information is displayed on the display of the first device.

6. The first device of claim 5,
    wherein the communicator provides information regarding a call connection from the communication terminal to the second device in response to a user input based on the displayed outgoing call information, and
    wherein the information regarding the call connection is used to determine whether the second device accepts the call from the communication terminal.

7. The first device of claim 6,
wherein, when a reject option included in a window in which the outgoing call information is displayed on the first device is selected based on a user input, the communicator provides a text message input through a message input window displayed on the first device in response to the selection to the second device, and
wherein the text message is transmitted to the communication terminal via the second device.

8. The first device of claim 1,
wherein, when a pre-set icon included in the widget window is selected based on a user input, the communicator requests the second device for capture information in response to a selection of the icon,
wherein the communicator receives the capture information generated in response to the request from the second device, and
wherein the capture information is displayed on the display of the first device.

9. The first device of claim 8,
wherein the communicator requests at least one of a screen capture image of the second device or an image captured by the second device,
wherein the capture information includes context information regarding the at least one of the screen capture image or the captured image,
wherein additional information related to the received capture information is collected from a server, and
wherein both the collected additional information and the capture information are displayed on the display of the first device.

10. A method of transmitting data in a first device, the method comprising:
executing a widget window for searching an information;
controlling to connect to a second device;
receiving, from the second device connected to the first device, an address book stored in the second device;
searching for information of a third device in which a predetermined application is installed from the received address book, based on a keyword input by a user through the widget window, the keyword including a pre-set tag value indicating a type of the predetermined application installed on the third device;
displaying a message transfer window for the searched third device;
selecting an object corresponding to data stored in the first device and inserting the selected object into the message transfer window based on a user input; and
providing the data corresponding to the inserted object stored in the first device to the third device via the second device.

11. A second device configured to provide an address book to a first device, the second device comprising:
a communicator; and
at least one processor configured to:
control to connect to the first device,
control the communicator to provide the address book stored in the second device to the connected first device,
control the communicator to receive from the first device data to be provided to a third device corresponding to information of a user found by the first device based on the address book, and
control the communicator to transmit the data to the third device in which a predetermined application is installed,
wherein the information of the user corresponding to the third device is searched from the address book based on a keyword input by a user through a widget window on a display of the first device, the keyword including a pre-set tag value indicating a type of the predetermined application installed on the third device.

12. The second device of claim 11,
wherein the address book is used by the first device to search for the third device, to which the data is transmitted, through the widget window displayed on the display of the first device,
wherein the address book is used by the first device to search for information of a user corresponding to a keyword input through the widget window, the input keyword including the tag value, and users in a user list included in the address book are filtered by the first device based on the tag value, and
wherein the tag value is identified based on types of applications installed in the third device.

13. The second device of claim 11, wherein the communicator provides the address book to the first device when the widget window displayed on the display of the first device is selected in the first device.

14. The second device of claim 11, wherein the communicator provides the address book to the first device when a keyword is input into the widget window displayed on the display of the first device.

15. The second device of claim 11,
wherein, if a communication terminal requests the second device for a call, the communicator provides outgoing call information of the communication terminal to the first device, and
wherein the provided outgoing call information of the communication terminal is displayed on the display of the first device.

16. The second device of claim 15,
wherein the communicator receives, from the first device, information regarding a call connection from the communication terminal, the information being generated by the first device based on the displayed outgoing call information, and
wherein the information regarding the call connection is used to determine whether the second device accepts the call from the communication terminal.

17. The second device of claim 11,
wherein the communicator receives, from the first device, a request of capture information in response to a selection of a pre-set icon included in the widget window in the first device,
wherein the communicator provides, to the first device, the capture information generated in response to the request, and
wherein the capture information includes at least one of a screen capture image of the second device or an image captured by the second device.

18. A method of providing an address book to a first device, the method comprising:
controlling to connect to the first device and providing the address book stored in a second device to the connected first device;
receiving, from the first device, data to be provided to a third device corresponding to information of a user found by the first device based on the provided address book; and
providing the data to the third device in which a predetermined application is installed, wherein the information of the user corresponding to the third device is searched from the address book based on a keyword input by a user through a widget window on a display of the first device, the keyword including a pre-set tag value indicating a type of the predetermined application installed on the third device.

19. A non-transitory computer-readable recording medium storing a computer-readable program configured to execute the method of claim 10.

20. A non-transitory computer-readable recording medium storing a computer-readable program configured to execute the method of claim 18.

* * * * *